(12) United States Patent
De Jong et al.

(10) Patent No.: US 10,126,192 B2
(45) Date of Patent: Nov. 13, 2018

(54) SENSOR FOR DETECTING PRESSURE WAVES IN A FLUID, PROVIDED WITH STATIC PRESSURE COMPENSATION

(71) Applicant: Fugro Technology B.V., Leidschendam (NL)

(72) Inventors: Willem De Jong, Leidschendam (NL); German Enrique Knoppers, Leidschendam (NL); Devrez Mehmet Karabacak, Leidschendam (NL); Bastiaan Meulblok, The Hague (NL)

(73) Assignee: FUGRO TECHNOLOGY B.V., Ieidschendam (NL)

( * ) Notice: Subject to any disclaimer, the term of this patent is extended or adjusted under 35 U.S.C. 154(b) by 103 days.

(21) Appl. No.: 15/036,573

(22) PCT Filed: Nov. 18, 2014

(86) PCT No.: PCT/NL2014/000043
§ 371 (c)(1),
(2) Date: May 13, 2016

(87) PCT Pub. No.: WO2015/076670
PCT Pub. Date: May 28, 2015

(65) Prior Publication Data
US 2016/0299026 A1 Oct. 13, 2016

(30) Foreign Application Priority Data
Nov. 19, 2013 (NL) ...................................... 1040505

(51) Int. Cl.
*G01H 3/00* (2006.01)
*G01H 9/00* (2006.01)
(Continued)

(52) U.S. Cl.
CPC .......... *G01L 11/025* (2013.01); *G01B 11/165* (2013.01); *G01H 3/00* (2013.01);
(Continued)

(58) Field of Classification Search
CPC . G01V 1/38; G01V 8/02; G01V 1/187; G01V 2210/1423; G01L 11/025;
(Continued)

(56) References Cited

U.S. PATENT DOCUMENTS 3,919,684 A  11/1975  Reed
4,016,952 A   4/1977  Reed
(Continued)

FOREIGN PATENT DOCUMENTS

EP  0045011 A1  2/1982
FR  2983954 A1  6/2013
GB  2437839 A   11/2007

OTHER PUBLICATIONS

The International Search Report and Written Opinion from PCT Application No. PCT/NL2014/000043 dated Jun. 29, 2015.

*Primary Examiner* — Harshad R Patel
*Assistant Examiner* — Brandi Hopkins
(74) *Attorney, Agent, or Firm* — Troutman Sanders LLP; Ryan Schneider

(57) ABSTRACT

A pressure sensor device having a chamber filled with a pressure transfer medium, the chamber having at least one window that at least partly transfers pressure waves in a fluid; an optical fiber extending longitudinally through the chamber, the optical fiber including a Fiber Bragg Grating and two mounting spots at opposite sides of the Fiber Bragg Grating; a frame having a first frame end and a longitudinally opposite second frame end; a pressure response assembly connected in parallel to a fiber portion between the two mounting spots, the pressure response assembly including a
(Continued)

series arrangement of a pressure response element and a movement damper; and a resilient member connected in series to the frame and to a parallel arrangement of the fiber portion and the pressure response assembly.

47 Claims, 16 Drawing Sheets

(51) Int. Cl.
- *G01L 7/18* (2006.01)
- *G01L 1/24* (2006.01)
- *G01L 7/06* (2006.01)
- *G01L 11/02* (2006.01)
- *G01B 11/16* (2006.01)

(52) U.S. Cl.
CPC ............. *G01H 9/004* (2013.01); *G01L 1/246* (2013.01); *G01L 7/065* (2013.01); *G01L 7/187* (2013.01)

(58) Field of Classification Search
CPC ....... G01L 1/246; G01L 9/0039; G01L 7/187; G01L 7/065; G01H 9/004; G01H 3/00; G01N 29/024; G01N 29/4427; G01N 2291/011; G01N 2291/024; G01N 29/222; G01N 33/28; G01N 2291/022; A61B 5/02154; G01B 11/165

See application file for complete search history.

(56) References Cited

U.S. PATENT DOCUMENTS

| | | | |
|---|---|---|---|
| 7,062,973 B2* | 6/2006 | Tam | G01L 11/025 250/227.14 |
| 7,197,934 B2* | 4/2007 | Wittrisch | G01L 9/0039 385/13 |
| 2004/0237648 A1* | 12/2004 | Jones | G01H 9/004 73/514.26 |
| 2006/0163456 A1 | 7/2006 | Wittrisch | |
| 2009/0241672 A1* | 10/2009 | Gysling | G01N 29/024 73/597 |
| 2011/0162906 A1 | 7/2011 | Harper | |

\* cited by examiner

SENSOR FOR DETECTING PRESSURE WAVES IN A FLUID, PROVIDED WITH STATIC PRESSURE COMPENSATION

CROSS-REFERENCE TO RELATED APPLICATIONS

This application is a US National Stage of International Application No. PCT/NL2014/000043 filed 18 Nov. 2014, which claims the benefit of NL 1040505 filed 19 Nov. 2013, each herein fully incorporated by reference.

FIELD OF THE INVENTION

The present invention relates in general to a sensor for detecting pressure waves in a fluid, particularly a liquid.

BACKGROUND OF THE INVENTION

In the art of reflection seismology, acoustic pulses are generated at the upper regions of a sea or an ocean, and reflected acoustic signals are measured and analysed. This technology is useful, for instance, for mapping the ocean floor and for exploring for oil and gas, in which case the structure below the floor surface is to be mapped.

The acoustic waves travel in the water as pressure waves, and are detected by pressure sensors. In a practical setup, a large plurality of sensors is arranged along the length of a cable of several kilometers long, with a mutual distance in the order of a few meters. The cable, indicated as "streamer", is towed in the water behind a ship. Measuring signals from the sensors travel along the streamer to a processing apparatus, usually located aboard the ship. In practice, the ship will be towing a plurality of such streamers parallel to each other, at a mutual distance in the order of about 50 meters. So all in all, a measuring array of many thousands of pressure sensors will be in operation.

The detection of acoustic waves is also utilized in sensors that are placed on the ocean bottom, either as single-spot sensors (Ocean Bottom Node) or as a series of sensors arranged in a cable. Further, the detection of acoustic waves is not limited to the use in exploration but is more broadly utilized in seismic detection, i.e. the detection of seismic waves, including such waves that may result from earthquakes.

In a typical prior art example, the pressure sensor is implemented as a piezo element, which comprises a piezo crystal. Pressure variations cause the piezo crystal to contract or expand, which in turn causes the piezo crystal to generate electrical signals. In such case, for transporting these electrical signals, a streamer needs to contain electrically conductive lines, which are typically made of copper, but which may alternatively be made of aluminium. In order to keep signal losses low, the conductive lines must be relatively thick. Alternatively, or additionally, such streamers need to include data acquisition units for combining and multiplexing or digitising the sensor signals. The same applies to other types of streamers, where the pressure sensors generate electrical signals.

It has already been proposed to replace the electrical signals by optical signals. This would allow the copper signal lines to be replaced by optical fibers. Instead of active sensors, which themselves generate optical signals, passive sensors have been proposed. With the phrase "passive" in this context is meant that an optical property of such sensor varies in response to variations in an ambient parameter, which optical property can be measured by interrogating the sensor with light. A passive optical element that has proven itself in this respect is a so-called Fiber Bragg Grating (FBG) reflector.

An FBG reflector consists of an optical fiber wherein, at some location, a series of material modifications is arranged lengthwise in the fiber. Normally, the optical properties of an optical fiber are constant along the length, which optical properties include the refractive index. Such material modification, however, has a slightly different refractive index. A plurality of such material modifications, at mutually the same distance, behaves as a grating, which typically is reflective for a small wavelength band. If a light pulse is made to enter the fiber, substantially all wavelengths will pass the grating location but light within said small wavelength band will be reflected. At the input end of the fiber, a reflected light pulse will be received, of which the wavelength is indicative for the mutual distance between the successive material modifications.

Such FBG reflector sensor is typically sensitive to (local) strain. Variations in strain cause variations in length of the fiber, including variations in distance between the successive material modifications of the Bragg grating. These distance variations, in turn, translate to variations in the wavelength of the reflected light.

It is noted that FBG reflectors are known per se, and that the use of FBG reflectors in streamers is known per se. Reference in this respect is made to, for instance, US patent applications 2011/0096624 and 2012/0069703, both of which are incorporated herein for all purposes. Since the examples of the present invention described herein are not directed to providing an improved optical fiber or an improved FBG and since the present invention can be implemented using optical fibers with FBG reflectors of the same type as currently are being deployed, a more detailed explanation of design and manufacture of optical fibers with FBG reflectors is omitted here.

In situations when the acoustic waves to be sensed are pressure waves in the sea water, since the FBG reflectors are mainly sensitive to longitudinal strain variations, a pressure sensor having an FBG reflector as sensitive element needs to have means for translating pressure variations to fiber strain variations.

At least some examples of a pressure sensor device useful according to the present invention have an FBG element as sensing element, that is suitable to be used for measuring water pressure waves in a streamer for use in marine surveying and exploration. It is to be noted, however, that such pressure sensor device may also be useful in other applications.

In some examples, (e.g., an application in a streamer or other type of cable), the pressure sensor device should have a cross section as small as possible, preferably less than a few cm. For a good measuring result, the pressure sensor device should be as sensitive as possible to the acoustic pressure signal, i.e. pressure variations within a frequency range of 0.5 Hz to several tens of kHz, it being noted that the frequency range of interest depends on the actual application. On the other hand, a streamer may be used close to the sea surface but also at a depth of for instance 40 m or more. Other applications for the sensor will require a usability at substantially larger depths, up to ocean bottom depth, typically 3000 m. Therefore, the pressure sensor device should be sensitive to very small pressure variations superimposed on a static background pressure that may vary in a range from 0 to perhaps 300 bar(g). Further, depending on the application, the pressure sensor device should preferably have low sensitivity to disturbances as caused by, for instance, flowing water.

It would be advantageous if the pressure sensor device were robust. In some examples, the sensors may be arranged in devices that should operate properly without the need for maintenance or repair over time periods of many months, and/or devices that are "handled" more often. Further, ideally, in the transport process from manufacturer to final destination, the pressure sensor device should be capable to withstand temperature in range from about −60° C. to about +70° C.

Further, the pressure sensor device should be small. Application in a cable, for instance a streamer, means that there is only limited space available to the pressure sensor device, and this applies particularly to the cross section. US patent application 2004/0184352, U.S. Pat. No. 6,882,595, incorporated herein by reference for all purposes, discloses a design where a fiber is wound tight on a hollow mandrel, wherein pressure variations cause variations in the mandrel diameter and consequently in the fiber length, but such design has several drawbacks. One drawback relates to the fact that winding the fiber obviously makes it necessary to bend the fiber. However, the radius of curvature of the bend should not be lower than a certain minimum, which puts a minimum to the diameter of the mandrel, which in turn translates to a relatively large diameter of the cable. For a streamer, it is however desirable to reduce the diameter as much as possible, because that would result in less material, less weight, less drag, and lower operational costs. Also, if cables are wound, a larger diameter is a disadvantage. Further, in the design of said US 2004/0184352, the operation relies on changing the length of the fiber between FBG sensing elements, due to excitation with acoustic waves. But the length of the fiber also changes due to mechanically induced excitations, due to variations of strain in the cable. Depending on application, yet especially in the case of streamers, the strain in the cable varies because of "jerk" stresses and swell waves. This causes background noise. It would be preferred if the sensor were less sensitive, ideally insensitive, to length variations of the fiber between FBG sensing elements.

Further, in the design of said US 2004/0184352, the operation relies on the fact that, when a hollow mandrel is subjected to an increase of outside pressure, its internal volume decreases in proportion to the pressure increase. The optimum response is achieved if the axial length of the mandrel does not change, but even then the response of the change in circumference, which is proportional to the change in length of the fiber, is only proportional to the square root of the change in pressure.

In the case of a design where a fiber is wound tight on a hollow mandrel, such as disclosed in said US 2004/0184352, this would mean that the FBG sensing element would be located in the fiber portion that is wound on the mandrel, which is a bent fiber portion. It is however not desirable to have the FBG sensing element in a bent fiber portion, because best accuracy is achieved when the FBG sensing element is subjected to axial tension only.

A pressure wave in a fluid can be considered as a dynamic pressure signal on a static pressure background. As will be explained in the following, it is desirable for a pressure wave sensor to be insensitive to changes in the static background pressure.

FIG. 1A is a graph illustrating schematically the wavelength response spectrum of an FBG. It is noted that the wavelength spectrum of a fiber laser would look similar, qualitatively. The horizontal axis represents wavelength, the vertical axis represents signal magnitude (arbitrary units). As already mentioned above, the FBG typically is reflective for a small wavelength band centered around a basic response wavelength $\lambda R$. For sake of clarity, the width of this band is exaggerated in the figure.

Assume in FIG. 1A that the basic response wavelength $\lambda R$ as shown applies for the case of atmospheric ambient pressure. In the case of traditional pressure sensors based on FBGs, pressure variations will translate to length variations and hence to variations of the response wavelength $\lambda R$. Thus, the position of the response wavelength $\lambda R$ can vary over a response range RR, wherein the width of this response range RR depends on the minimum and maximum values of the pressure to be expected, and also on the ratio between pressure variations and wavelength shifts (response factor, amplification factor).

In a practical situation, a single fiber may contain multiple FBG sensor portions along its length. For distinguishing the various reflection signals originating from the different sensors, if no time domain multiplexing is used, the different sensors are set to have mutually different basic response wavelengths $\lambda R$. This can for instance be done by having mutually different grating parameters of the various FBGs and/or by giving the respective fiber portions mutually different bias tension. The setting of the different sensors will be such that the corresponding response ranges do not overlap. FIG. 1B is a graph comparable to FIG. 1A, on a different scale, schematically showing five adjacent response ranges with their corresponding wavelength response spectrums. It is to be noted that in practice the number of sensors N may be smaller or larger than five.

For practical purposes, only a small overall bandwidth is available for the sensors. While the precise location of this bandwidth may depend on the fiber composition, a suitable example is a range from 1510 nm to 1550 nm, i.e. a bandwidth of 40 nm. Under static circumstances, this entire bandwidth would be available for the N sensors, and each sensor could have a response range of 40/N nm wide.

However, especially in the case of sensors to be used under water, it is a problem that the ambient pressure is not constant. If a sensor is to be used at depths from 0 to 40 m, the ambient pressure varies over 400 kPa. This is a pressure range much larger than the pressure variations expected due to acoustic waves. For absolute pressure sensors, i.e. pressure sensors that respond to the absolute pressure, the response wavelength $\lambda R$ would be shifted over a large distance. Assuming a shift of 50 fm/Pa as a reasonable approximation, a shift of the response wavelengths of 20 nm is to be expected. This would mean that only 20 nm bandwidth would actually remain available for the sensors, i.e. each sensor could only have a response range of 20/N nm wide.

This is illustrated in FIG. 1C, which is a graph comparable to FIG. 1B, on a different scale, schematically showing the five adjacent response ranges with their corresponding wavelength response spectrums at low pressure (close to the surface, indicated at A) and at high pressure (deep in the water, indicated at B), assuming that higher pressure results in longer wavelength. This sensitivity to ambient pressure means that the response range per sensor, and hence the dynamic pressure range that each sensor can handle, decreases with increasing water depth range, and/or that the possible number of sensors per fiber decreases. The latter option is hardly feasible in the case of streamers having a fixed number of sensors per fiber, especially when used at depths much deeper than 40 m.

It is to be noted that a similar problem exists for sensors where higher pressure results in shorter wavelength.

It is further to be noted that an FBG sensing element can be used in several configurations, which have in common that they comprise an FBG portion. If the FBG sensor is to be used for interrogation by external light, while the FBG portion reflects light of which the wavelength matches the grating, such sensor will be indicated as "reflector". It is also possible that the FBG sensor is used as mirror portion in a fiber laser, so that the laser output wavelength matches the grating; the laser may for instance be a distributed feed back (DFB) fiber laser, or a distributed Bragg reflector (DBR) fiber laser. It is noted that the wavelength spectrum of a fiber laser looks similar, qualitatively, to the single wavelength reflection spectrum of FIG. 1A.

It is further noted that the fiber can be single core or multi core.

In the above, a problem has been described that relates to an FBG sensing element. It is noted, however, that the present invention is not only related to problems with FBG sensing elements. Any sensor type will give a "zero signal" if the variable to be sensed is zero, and will give an actual signal within a dynamic range corresponding to the dynamic range of the variable. If the variable is varied in a relative narrow range at a relative large distance from zero, the same will hold for the actual measuring signal, which in general will imply a low signal to noise ratio, if the sensor is sensitive to the absolute value of the variable, It is therefore more generally desirable to have a pressure sensor device in which the sensitivity to the static pressure is very small or even zero, so that the dynamic range of the sensor output signal is closer to the "zero signal".

SUMMARY OF EXAMPLES OF THE INVENTION

It is a particular objective of the present invention to provide a pressure sensor device in which the sensitivity to the static ambient pressure is very small or even zero.

In one aspect, the present invention relates to a pressure sensor device comprising:
- two reference spots defining between them an operative direction along a virtual straight line connecting said spots;
- at least one resilient tension member exerting a tension force on at least one of said reference spots in a direction parallel to said operative direction;
- at least one resilient member connecting said reference spots, the resilient member preferably having a stiffness larger than the stiffness of the tension member;
- at least one pressure response assembly connected in parallel to said resilient member and coupled to said reference spots, the or each pressure response assembly comprising a series arrangement of at least one pressure response means and at least one high-pass force-transmission member; wherein the pressure response means has an operative length parallel to said operative direction that is responsive to pressure, and is arranged for exerting operative forces pulling or pushing in a direction parallel to said operative direction; and
- wherein the high-pass force-transmission member is arranged for substantially passing said operative forces having a frequency above a threshold frequency and for substantially reducing or blocking said operative forces having a frequency below said threshold frequency;
- measuring means for measuring the actual distance between said reference spots as being representative for the pressure to be sensed.

In a particular embodiment, said pressure sensor device further comprises:
- a chamber filled with a pressure transfer medium, the chamber being suitable for immersion in a fluid and having at least one window that at least partly transfers pressure waves in such fluid;
- wherein said pressure response means is arranged within said chamber and is responsive to the pressure of the pressure transfer medium.

In a particular embodiment, said pressure transfer medium comprises a liquid.

In a particular embodiment, said resilient member comprises an optical fiber portion tensioned between said reference spots.

In a particular embodiment, said measuring means comprise an optical fiber portion tensioned between said reference spots.

In a particular embodiment, said optical fiber portion comprises an optical sensing portion.

In a particular embodiment, said sensing portion comprises at least one Fiber Bragg Grating.

In a particular embodiment, said Fiber Bragg Grating comprises a reflector for reflecting a wavelength portion of an external interrogating light beam.

In another particular embodiment, said Fiber Bragg Grating comprises a mirror of a fiber laser.

In another particular embodiment, said sensor device further comprises:
- a frame having a first frame end and a longitudinally opposite second frame end;
- wherein said tension member is connected between one of said two reference spots and one of said two frame ends.

In another particular embodiment, said sensor device further comprises:
- a frame having a first frame end and a longitudinally opposite second frame end;
- wherein said tension member is connected between one of said two reference spots and one of said two frame ends.

In another particular embodiment, said sensor device further comprises:
- a frame having a first frame end and a longitudinally opposite second frame end;
- wherein said tension member is connected in series to the parallel arrangement of said pressure response assembly and said optical fiber portion.

In a particular embodiment, said pressure response means comprises a pressure response element provided with a progressive counterforce generator means.

In a particular embodiment, said pressure response element comprises a piston in a cylinder.

In a particular embodiment, said pressure response element comprises a bellows.

In a particular embodiment, said pressure response element comprises a Bourdon tube.

In a particular embodiment, said tension member is connected between one of said two reference spots and a first frame end, and wherein the other of said two reference spots is fixed with respect to an opposite second frame end. In another particular embodiment, a first tension member is connected between one of said two reference spots and a first frame end, and wherein a second tension member is connected between the other of said two reference spots and an opposite second frame end.

In a particular embodiment, said pressure sensor device further comprises two pressure response assemblies connected in parallel, wherein said two pressure response assemblies and said resilient member are arranged in a common virtual plane. In another particular embodiment, said pressure sensor device further comprises three or more pressure response assemblies connected in parallel, wherein said three pressure response assemblies are arranged around said resilient member. In a more particular embodiment, said pressure response assemblies are arranged around said resilient member at mutually equal angular intervals.

In a particular embodiment, each pressure response assembly is mirror-symmetric with respect to a virtual transverse mirror plane.

In a particular embodiment, each pressure response assembly comprises one pressure response means arranged in series in between two force-transmission members.

In a particular embodiment, a central portion of said pressure response assembly is fixed with respect to the frame.

In a particular embodiment, each pressure response assembly comprises a series arrangement of two pressure response means arranged in series in between two force-transmission members.

In a particular embodiment, a point between said two pressure response means is fixed with respect to the frame.

In a particular embodiment, each pressure response assembly comprises a series arrangement of force-transmission members arranged in series in between two pressure response means.

In a particular embodiment, each high-pass force-transmission member comprises a piston reciprocating in a cylinder filled with a fluid.

In a particular embodiment, the two pistons of said two force-transmission members are connected together. In another particular embodiment, the two cylinders of said two force-transmission members are connected together.

In a particular embodiment, the pressure sensor device further comprises:
a first force-transmission member comprising a first piston reciprocating in a first cylinder, wherein a first end of said first piston connects to one of said two mounting spots and wherein an opposite second end of said first piston connects to the frame via a first tension member;
a second force-transmission member comprising a second piston reciprocating in a second cylinder, wherein a first end of said second piston connects to the other of said two mounting spots and wherein an opposite second end of said second piston connects to the frame via a second tension member;
at least one pressure response means having a first end and a second end, wherein the first end of the or each pressure response means is connected to the first cylinder and the second end of the or each pressure response means is connected to the second cylinder.

In another aspect, the present invention relates to a streamer section for exploration, comprising at least one pressure sensor device as mentioned above.

In yet another aspect, the present invention relates to a streamer for exploration, comprising at least one pressure sensor device as mentioned above.

In yet another aspect, the present invention relates to a streamer array, comprising two or more streamers as mentioned above.

In yet another aspect, the present invention relates to an exploration system, comprising at least one streamer as mentioned above or a streamer array as mentioned above, a ship for towing the streamer or the streamer array, respectively, and a processing apparatus for receiving and processing measuring signals from the sensor devices.

In yet another aspect, the present invention relates to a cable intended for being laid on an ocean floor, for subsea pressure monitoring or submarine acoustic detection, the cable comprising at least one pressure sensor device as mentioned above. Here, the phrases "ocean" and "subsea" are to be interpreted broadly, as referring to any body of water, such as oceans, seas, rivers, etc.

In yet another aspect, the present invention relates to an Ocean Bottom Node, intended for being laid on an ocean floor, comprising at least one sensor, a processing apparatus receiving and processing a light output signal from the sensor, a transmitter for wirelessly transmitting the measurement results, and a battery for powering the processing apparatus and the transmitter, wherein the sensor is an pressure sensor device as mentioned above.

In yet another aspect, the present invention relates to a microphone, comprising at least one pressure sensor device as mentioned above.

In yet another aspect, the present invention relates to a method of affecting the optical properties of an optical fiber. The method comprises tensioning an optical fiber having at least one FBG contained therein at a constant tension; maintaining the constant tension as the optical fiber is moved in the fluid from a first average pressure region to a second average pressure region; isolating a pressure transfer medium from the fluid; transmitting at least part of the pressure wave to the pressure transfer medium; generating a force responsive to said transferring; and changing, along a straight path, the length of the optical fiber in response to the force.

In a specific embodiment, said tensioning comprises mounting a first portion of the optical fiber to frame, and mounting a second portion of the optical fiber to a resilient member, the resilient member being connected to the frame, wherein the fiber is tensioned in a straight line.

In a specific embodiment, said changing comprises applying a force to a structural member attached to the resilient member. Said maintaining may comprise adjusting tension in the structural member in response to changes in average pressure from the first average pressure region to the second average pressure region.

In yet another aspect, the present invention relates to a system to affect the optical properties of an optical fiber. The system comprises means for tensioning an optical fiber having at least one FBG contained therein at a constant tension; means for maintaining the constant tension as the optical fiber is moved in the fluid from a first average pressure region to a second average pressure region; means for isolating a pressure transfer medium from the fluid; means for transmitting at least part of the pressure wave to the pressure transfer medium; means for generating a force responsive to said transferring; and means for changing, along a straight path, the length of the optical fiber in response to the force.

In a specific embodiment, said means for tensioning comprises a mount of a first portion of the optical fiber to frame, and a mount of a second portion of the optical fiber to a resilient member, the resilient member being connected to the frame, wherein the fiber is tensioned in a straight line.

In a specific embodiment, said means for isolating comprises a chamber including a frame enclosed therein. Said means for transmissing may comprise a window in the chamber covered by a flexible membrane.

In a specific embodiment, said means for generating a force comprises an element that changes its length in response to a change in pressure, wherein said element is connected lengthwise in the structural member. Said element may comprise a bellows connected in the length of the structural member. Said element may comprise a piston residing in a cylinder connected in the length of the structural member. Said means for changing the length of the optical fiber may comprise a means for attaching the structural member to the optical fiber. Said means for attaching may comprise a connecting member attached to the structural member and to the resilient member. Said means for maintaining may comprise a means for adjusting tension in the structural member in response to changes in average pressure from the first average pressure region to the second average pressure region. Said means for adjusting the tension in the structural member may comprise a piston residing in a cylinder located along the length of the structural member.

In yet another aspect, the present invention relates to a method for performing seismic exploration. The method comprises arranging an optical fiber in an ocean; generating acoustical pressure waves in said ocean; receiving acoustical pressure waves with said optical fiber; and affecting the optical properties of the optical fiber in response to the received acoustical pressure waves.

In yet another aspect, the present invention relates to a method for performing seismic exploration. The method comprises arranging a plurality of optical fibers in a streamer; arranging the streamer in an ocean; generating acoustical pressure waves in said ocean; receiving acoustical pressure waves with at least one of said optical fibers; and affecting the optical properties of said optical fiber in response to the received acoustical pressure waves.

In yet another aspect, the present invention relates to a method for performing seismic exploration. The method comprises providing a plurality of streamers, each streamer comprising a plurality of optical fibers; arranging the streamers in a streamer array; arranging the streamer array in an ocean; generating acoustical pressure waves in said ocean; receiving acoustical pressure waves with at least one of said optical fibers; and affecting the optical properties of said optical fiber in response to the received acoustical pressure waves.

In a specific embodiment, said streamer or streamer array, respectively, is towed through said ocean. In a specific embodiment, the optical properties of said optical fiber are measured, and measuring signals from the said optical fiber are received and processed.

In yet another aspect, the present invention relates to a method for subsea pressure monitoring. The method comprises arranging a plurality of optical fibers in a cable; arranging the cable on an ocean floor; receiving acoustical pressure waves with at least one of said optical fibers; and affecting the optical properties of said optical fiber in response to the received acoustical pressure waves.

In yet another aspect, the present invention relates to a method for submarine acoustic detection. The method comprises arranging a plurality of optical fibers in a cable; arranging the cable on an ocean floor; receiving acoustical pressure waves with at least one of said optical fibers; and affecting the optical properties of said optical fiber in response to the received acoustical pressure waves.

In yet another aspect, the present invention relates to a method for submarine acoustic detection. The method comprises arranging an optical fiber in an ocean bottom node; arranging the bottom node on an ocean floor; receiving acoustical pressure waves with said optical fiber; affecting the optical properties of said optical fiber in response to the received acoustical pressure waves; measuring the optical properties of said optical fiber, receiving and processing measuring signals from the said optical fiber; and wirelessly transmitting the measurement results.

In yet another aspect, the present invention relates to a method for picking up sound. The method comprises arranging an optical fiber in air; receiving sound waves with said optical fiber; and affecting the optical properties of the optical fiber in response to the received sound waves.

In yet another aspect, the present invention relates to a method of sensing a pressure in a medium. The method comprises the steps of providing two reference spots; connecting at least one resilient member between said two reference spots; exerting a tension force on the resilient member; receiving a pressure wave in said medium; generating a pressure response force in response to the momentary pressure in the medium; high-pass filtering said pressure response force to obtain a filtered response force; subtracting the filtered response force from the tension force; and optically measuring the actual distance between said reference spots as being representative for the pressure to be sensed. Said resilient member may comprise an optical fiber comprising a Fiber Bragg Grating.

In yet another aspect, the present invention relates to a method of sensing a pressure in a medium. The method comprises the steps of providing two reference spots; receiving a pressure wave in said medium; generating a pressure response force in response to the momentary pressure in the medium; high-pass filtering said pressure response force to obtain a filtered response force; applying the filtered response force to at least one of said reference spots; and optically measuring the actual distance between said reference spots as being representative for the pressure to be sensed.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1A:
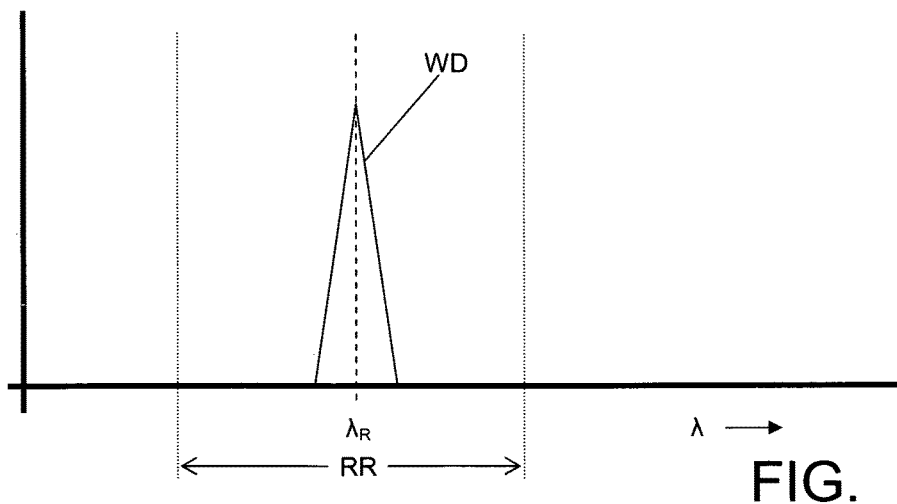
FIG. 1A is a graph illustrating schematically the wavelength response spectrum of an FBG.
Figure 1B:
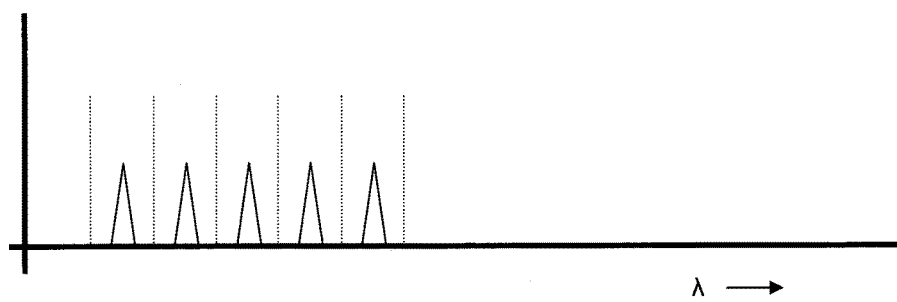
FIG. 1B is a graph comparable to FIG. 1A, on a different scale, schematically showing ten adjacent response ranges of ten different sensors.
Figure 1C:
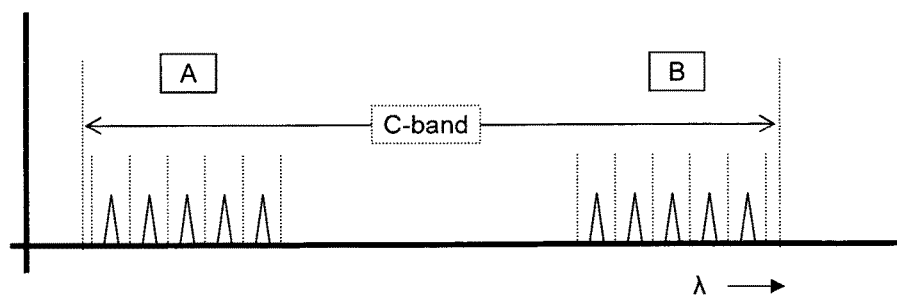
FIG. 1C, which is a graph comparable to FIG. 1B, on a different scale, schematically illustrating static pressure response of a plurality of sensors.
Figure 2A:
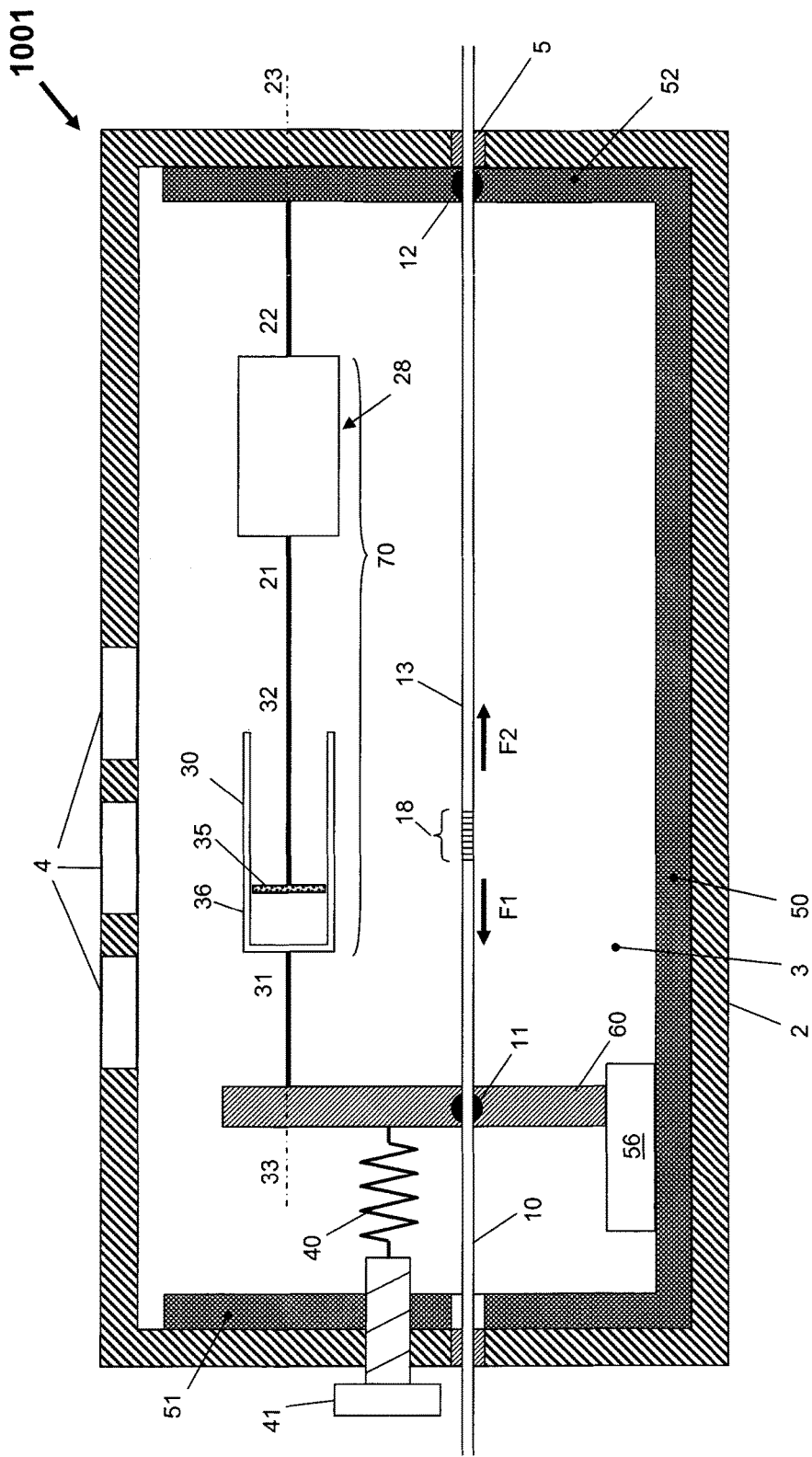
FIG. 2A is a diagram schematically illustrating the basic design and operation of an optical pressure sensor device according to the present invention.

FIG. 2A is a diagram schematically illustrating the basic design and operation of an exemplary pressure sensor device 1001 according to the present invention. The pressure sensor device is intended to sense the pressure in a surrounding medium, which will typically be a fluid and which in most practical cases will typically be a liquid or a gas. For marine applications, this liquid will typically be water, more particularly seawater. Nevertheless, the pressure sensor device of the present invention can also be used in a gaseous environment, for instance air. Hereinafter, for sake of simplicity, the surrounding medium will also simply be indicated as "surrounding fluid" and the momentary pressure of the surrounding medium (in the immediate vicinity of the sensor) will also simply be indicated as "surrounding pressure" or "fluid pressure".

In some embodiments of the pressure sensor device, the components of the pressure sensor device may be in direct contact with the surrounding medium, but this is generally not preferred. Therefore, in the embodiment shown, the pressure sensor device 1001 comprises a chamber 2 having its interior filled with a pressure transfer medium 3. The chamber 2 is designed such as to allow surrounding pressure to reach the pressure transfer medium, the design depending on the circumstances.

In an exemplary embodiment, the pressure transfer medium is a gas. In another exemplary embodiment, the pressure transfer medium is a liquid. In yet another exemplary embodiment, the pressure transfer medium is a gel. In yet another exemplary embodiment, the pressure transfer medium is a silicone material with pressure transfer properties similar to the properties of a liquid. In yet another exemplary embodiment, the pressure transfer medium is a rubber material with pressure transfer properties similar to the properties of a liquid. In yet another exemplary embodiment, the pressure transfer medium is a mixture of any of the above-mentioned materials. In a preferred embodiment, this pressure transfer medium may advantageously be an oil.

In some applications, the pressure transfer medium is identical to the surrounding fluid. In such case, embodiments are possible where the chamber 2 is in open communication with the surroundings. In case the pressure transfer medium differs from the surrounding fluid, and/or in cases where it is undesired that surrounding fluid enters the chamber 2, the chamber 2 is preferably sealed, as shown. Although sealed, the chamber 2 has at least one window 4 that is at least partly transparent to pressure waves so that, when immersed in an surrounding fluid, the pressure of the pressure transfer medium 3 in the chamber 2 is responsive to the surrounding pressure, i.e. the pressure of the pressure transfer medium 3 in the chamber 2 will vary with the surrounding pressure. It is preferred that the pressure of the pressure transfer medium 3 in the chamber 2 is proportional to the surrounding pressure, at least within an operating pressure range, and ideally the pressure of the pressure transfer medium 3 in the chamber 2 is substantially identical to the surrounding pressure, but this is not essential. It is sufficient if the pressure of the pressure transfer medium 3 in the chamber 2 is a function of the surrounding pressure, which function can be established for calibrating the pressure sensor device.

For instance, the window 4 may be implemented as a membrane. The membrane material will be selected to be compatible with the surrounding fluid and the pressure transfer medium, to be impervious to the surrounding fluid and the pressure transfer medium, and will be flexible enough to transfer pressure. Suitable materials may include rubber and silicone, or may include a metal foil.

Within the chamber 2, an elongate frame 50 is arranged, fixed to the chamber 2. As shown, the frame 50 may have a rectangular shape, with a first longitudinal frame end 51 and a second longitudinal frame end 52.

The pressure sensor device 1001 comprises two reference spots 11, 12 defining between them an operative direction along a virtual straight line connecting said spots. This operative direction is the horizontal direction in FIG. 2A.

The pressure sensor device 1001 further comprises at least one resilient tension member 40 exerting a bias force on at least one of said reference spots 11, 12 in a direction parallel to said operative direction. In the exemplary embodiment shown, this tension member 40 is implemented as a helix spring, but other embodiments are also possible. The tension member 40 is arranged between the first reference spot 11 and the first longitudinal frame end 51. The tension member 40 may be provided with an adjustment screw 41, as shown, for adjusting the tension force.

The pressure sensor device 1001 further comprises at least one resilient member 13 connecting said reference spots 11, 12. The resilient member 13 has, in some embodiments, a stiffness larger than the stiffness of the tension member 40, but this is not essential. In the embodiment shown, said resilient member 13 comprises an optical fiber portion tensioned between said reference spots 11, 12.

In the embodiment shown, the second reference spot 12 is fixed with respect to the second longitudinal frame end 52. When the tension member 40 exerts a pulling force on the first reference spot 11 and hence on the resilient member 13, an opposing force of equal magnitude will be exerted on the resilient member 13 by the second longitudinal frame end 52, thus generating tension in the resilient member 13. In the embodiment where the resilient member 13 comprises an optical fiber portion, such fiber portion will be held taut in a straight line. It is further noted that, in a steady state, the force in the resilient member 13 is equal to the force in the tension member 40.

The pressure sensor device 1001 further comprises at least one pressure response assembly 70 connected in parallel to said resilient member 13 and coupled to said reference spots 11, 12. In FIG. 2A, only one pressure response assembly 70 is shown. The pressure response assembly 70 comprises a series arrangement of at least one pressure response means 28 and at least one high-pass force-transmission member 30.

The pressure response means 28 is arranged for responding to the pressure of the pressure transfer medium 3. The pressure response means 28 has two mutually opposite interaction ends 21, 22 connected to the first and second mounting spots 11, 12, respectively, either directly or indirectly. A virtual line connecting these two interaction ends 21, 22 will be indicated as operational axis 23, and the direction of this axis 23 will be indicated as axial direction, which will be parallel to said operative direction. The two interaction ends 21, 22 are capable of being displaced relative to each other in the axial direction when a net external force (pushing or pulling) is exerted on said ends. The size of the pressure response means 28 as measured along the operational axis 23 will hereinafter be indicated as "operative length". A feature of the pressure response means is that the operative length is responsive to pressure, i.e. its length is a function of the net external force. The pressure response means 28 is arranged for exerting operative forces pulling or pushing in a direction parallel to said operative direction.

Figure 2C:
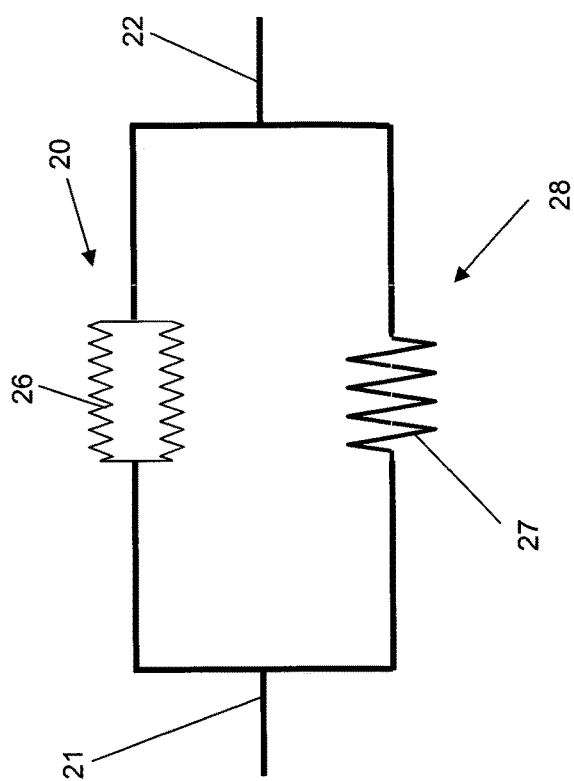
FIG. 2C is a diagram schematically illustrating another possible embodiment of a pressure response element.
Figure 2B:
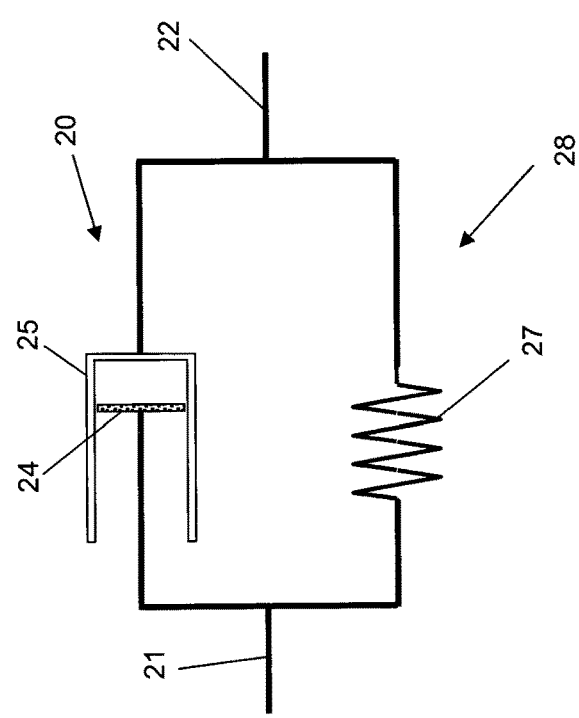
FIG. 2B is a diagram schematically illustrating a possible embodiment of a pressure response element.

As will be explained with reference to FIGS. 2B and 2C, the pressure response means 28 functionally comprises a pressure response element 20 in parallel with a progressive counterforce generator means 27, this parallel arrangement being connected to the interaction ends 21, 22.

A pressure response element is designed for converting external pressure to mechanical force. The pressure response element 20 can be implemented in several ways. FIG. 2B illustrates an embodiment where the pressure response element 20 comprises a piston 24 in a cylinder 25, while FIG. 2C illustrates an embodiment where the pressure response element 20 comprises a bellows 26. An axial force is generated by the pressure difference between external pressure and the pressure within the cylinder 25 or bellows 26, respectively, multiplied by the cross-sectional surface of the piston 24 or bellows 26, respectively.

The progressive counterforce generator means 27 is for generating a counterforce that progressively increases/decreases with progressing displacement of the interaction ends 21, 22, in order to achieve that the interaction ends 21, 22 remain substantially stationary at a mutual distance depending on pressure, i.e. that the pressure response means 28 will remain substantially stationary at a length depending on pressure. Thus, this length will be representative for the pressure. Herein, the progressive counterforce generator 27 represents the stiffness of the pressure response means 28. Such progressive counterforce generator 27 may for instance be implemented as a helix spring mounted in parallel to the pressure response element 20, as shown in FIGS. 2B and 2C.

In some embodiments, the progressive counterforce generator 27 is an external component mounted adjacent the pressure response element 20. It is also possible that a helix spring is arranged around the cylinder 25 or bellows 26, respectively. It is also possible that a progressive counterforce generator 27 is located within the cylinder 25 or bellows 26, respectively. If the cylinder 25 or bellows 26, respectively, is filled with gas, the gas being compressed also acts as a counterforce generator. In the case of a bellows, in some embodiments the structure of the bellows wall has sufficient stiffness, so that the progressive counterforce generator 27 is effectively integrated in the pressure response element 20.

In the following, the embodiments of the invention will be further explained and illustrated for the case where the pressure response means 28 is implemented as a bellows with sufficient intrinsic stiffness, i.e. with integrated counterforce generator. In a possible embodiment, the bellows is preferably made of metal. For example, a metal bellows can be made by electro-deposition of metal on a mandrel, and then removing the mandrel material (for instance thermally or chemically) such that the metal bellows remain. The choice of bellows material, bellows length and diameter, and pitch and depth of the bellows undulations are parameters in the bellows design, as will be appreciated by a person skilled in the art, to obtain desired bellows properties, especially stiffness. Bellows do not necessarily have a circular cross sectional contour.

As explained above, the pressure response means 28 has a physical property of responding to changes in outside pressure by changing its operative length. Although some possibilities have been described for designs that achieve this effect, the invention is not limited to these possibilities, since many more possibilities exist for converting pressure (variation) to displacement (variation).

Ideally, the length variations are substantially proportional to the pressure variations. Then, the behaviour of the pressure response means 28 can be described by the following formula:

$$\Delta L = \Delta F/K = \Delta P \cdot A/K$$

in which:
$\Delta P$ indicates a pressure variation;
$\Delta F$ indicates a resulting variation in axial force exerted on the response element;
$A$ indicates a cross-sectional area of the response element;
$K$ indicates axial stiffness of the response unit.

Reference is again made to FIG. 2A. The high-pass force-transmission member 30 is a device having two mutually displaceable components 31, 32, capable of being displaced in a movement direction relative to each other when an external force (pushing or pulling) is exerted on said components. This movement direction will be indicated as operational axis 33. The high-pass force-transmission member 30 has a first one 31 of said mutually displaceable components connected to the first reference spot 11, and has the second one 32 of said mutually displaceable components connected to the pressure response means 28.

The high-pass force-transmission member 30 has a physical property of frequency-dependent resistance between said two components 31, 32 against displacement of said two components 31, 32 with respect to each other, which resistance is low for low frequencies and high for high frequencies. Thus, a displacement of said two components 31, 32 with respect to each other will result in a frequency-dependent reaction force being generated between these two components 31, 32. In some embodiments, this reaction force may be proportional to the external force exerted by the pressure response means 28. In some embodiments, this reaction force may be proportional to the speed of change of the external force exerted by the pressure response means 28. In some embodiments, this reaction force may be proportional to both. In any case, the net result will be that mutual displacement of the components 31, 32 will be slowed down. Therefore, the high-pass force-transmission member 30 will also be indicated as movement damper.

In view of said frequency-dependent resistance, the high-pass force-transmission member 30 has, at least in the operative direction, a frequency-dependent force transmission property. Particularly, said operative forces of the pressure response means 28 will substantially pass the transmission member 30 if these forces have a frequency above a threshold frequency, whereas said operative forces of the pressure response means 28 will be substantially reduced or blocked if these forces have a frequency below said threshold frequency.

If a continuous (static) force is exerted by the pressure response means 28, the components 31, 32 of the force-transmission member 30 will slowly move in accordance with said force, wherein the displacement speed will be inversely proportional to the applied force; it can thus not be understood that the force-transmission member 30 can not transmit static force over a prolonged time, and an equilibrium position is only achieved when the force reduces to zero. If the pressure response means 28 were to adopt a new operative length in a stepwise manner, the resulting force will cause the components 31, 32 of the force-transmission member 30 to slowly give way to this force, causing this force to reduce, until finally a new equilibrium position in a new steady state is reached while said force has reduced to zero. The time it takes before achieving the equilibrium position will depend on the resistance, and will increase with said resistance. A "response time constant" may be defined as the time it takes before said force has reduced by 50%.

If an alternating force is exerted by the pressure response means 28, the force-transmission member 30 will respond by having its components move in an alternating manner with respect to each other, but with increasing frequency the amplitude of the relative movement will decrease. Above a certain threshold frequency, the amplitude of the relative movement may be neglected and the two components 31, 32 may be considered as being mechanically fixed to each other, at an equilibrium position that corresponds to a temporal average of the alternating force. This means that, as far as transferring length variations or forces, the force-transmission member 30 can be regarded as a high-pass filter, i.e. at sufficiently high frequencies the reaction force exerted by the force-transmission member 30 is equal to the force exerted by the pressure response means 28.

For implementing the force-transmission member 30, several designs will be possible.

In some embodiments, the force-transmission member 30 comprises a piston 35 reciprocating in a cylinder 36 filled with a fluid. In some specific embodiments, the fluid is a dilatant fluid. In some other specific embodiments, the fluid is a magneto rheological fluid. In yet some other embodiments, the cylinder 36 is provided with a flow choke, i.e. a small opening through which the fluid can exit or enter the cylinder. The piston/cylinder combination does not need to have a circular cross sectional contour.

In some alternative embodiments, the force-transmission member 30 comprises a coil of wire in stead of the cylinder 36 and a magnetic core in stead of the piston 35, and the counter force is applied through electromagnetic induction.

In some alternative embodiments, the force-transmission member 30 comprises a choked bellows.

It is to be noted that a designer has some freedom to design the response time constant within a wide range of values by varying one or more of the parameters of the force-transmission member 30, for instance the viscosity of the pressure transfer medium 3, the dimensions of the device and the stiffnesses of attached elements. It may also be possible to adjust the response time constant by adjusting the tension force of the tension member 40, for instance by adjusting the adjustment member 41.

The operation of the pressure sensor device 1001 is as follows. In an equilibrium condition of the device, there is no force acting on the force-transmission member 30 and hence the pressure response assembly 70 does not exert any force on the first reference spot 11, and the tension in the resilient member 13 balances the tension in the resilient member 40.

If the device is subjected to acoustic pressure variations, above a threshold frequency, the force-transmission member 30 operates as a rigid member between the first reference spot 11 and the pressure response means 28. The pressure response means 28 will respond to the pressure variations by exhibiting length variations, which will be allowed by the resilient tension member 40 in that the resilient tension member will exhibit corresponding but opposite length variations. The force-transmission member 30 will substantially not exhibit any length variations. If the pressure (momentarily) increases, the pressure response means 28 will contract and the resilient member 40 will expand, resulting in a shortening of the mutual distance between the two reference spots 11, 12. Conversely, if the pressure (momentarily) decreases, the pressure response means 28 will expand and the resilient member 40 will contract, resulting in a lengthening of the mutual distance between the two reference spots 11, 12. It is to be noted that the response characteristic, i.e. the distance variation as a function of pressure variation, depends on the combined stiffnesses of response means 28, resilient member 40 and resilient member 13, and also depends on the response time constant.

When surrounding pressure is slowly changed, for instance because atmospheric pressure increases, or because the device is lowered to a deeper location in water, on a time scale larger than the period time of acoustic pressure variations and hence much larger than the response time constant, the pressure response means 28 will respond in the same way by, in this example, shortening its length. The pressure response assembly 70 will then exert a pulling force on the first mounting spot 11, lengthening the resilient member 40 and shortening the mutual distance between the two reference spots 11, 12. However, this can only persist for as long as the force-transmission member 30 will transmit the pulling force of the pressure response means 28. Over time, however, the force-transmission member will expand as a result of the steady pulling force exerted on the force-transmission member 30. An equilibrium situation will occur when the expansion of the force-transmission member 30 has exactly compensated the contraction of the pressure response means 28. In this situation, the resilient member 13 is (again) only tensioned by the resilient member 40. The initial equilibrium condition has returned, with the same bias tension in the resilient member 13 and the same mutual distance between the two reference spots 11, 12.

Thus, static pressure variations are fully compensated and hence do not result in any change in the mutual distance between the two reference spots 11, 12. Further, in embodiments in which the behaviour of pressure response means 28 is designed to be linear, the sensitivity to dynamic pressure variations has remained constant, independent of the absolute static pressure.

From the above explanation, it should be clear that the mutual distance between the two reference spots 11, 12 is a measure representative of the pressure, with low-frequency pressure variations filtered out. The pressure sensor device further comprises measuring means for measuring the actual distance between said reference spots 11, 12 as being representative for pressure.

Several measuring techniques can be employed for measuring said distance between said reference spots 11, 12. In the embodiment as portrayed in FIG. 2A, the measuring means are optical measuring means, and comprise an optical fiber 10 extending through the chamber 2, parallel to the operative direction and fixed with respect to the reference spots 11, 12, with an optical sensing portion 18 in the fiber portion between said reference spots 11, 12. Particularly, in the embodiment shown, the fiber portion between said reference spots 11, 12 is also the resilient member 13 mentioned earlier. Further, in the embodiment shown, the sensing portion 18 includes at least one Fiber Bragg Grating (FBG) 18.

It can be seen that the fiber 10 extends through small holes in the walls of the chamber 2. In these holes, a sealant 5 is preferably applied for preventing leakage of the pressure transfer medium 3.

It has already been explained in the above that tension is generated in the stretch of fiber 13 between the first and second reference spots 11, 12. This tension is indicated in FIG. 2A as opposing forces F1 and F2 of equal magnitude, directed away from each other. As a result, this stretch of fiber will be held taut in a straight line. The exact shape of the fiber outside the first and second reference spots 11, 12 is not essential, and further the fiber outside the first and second reference spots 11, 12 may be free of tension.

Said stretch of fiber will also be indicated as tensioned fiber portion 13.

Varying said distance between said reference spots 11, 12 will result in variations in the tension in the tensioned fiber portion 13, and hence will result in length variations of the FBG 18, which can be optically measured, as explained above and known per se.

In the most basic embodiment, one of the reference spots 11, 12 is fixed with respect to the frame 50, while the other of the reference spots is coupled to this frame 50 via the resilient tension member 40. In an exemplary embodiment, this resilient tension member 40 is implemented as a helix spring, as shown, but other embodiments are also possible. An important function of the resilient tension member 40 is to exert a tension force on the tensioned fiber portion 13. Among other things, this tension force determines the nominal response wavelength of the FBG. In some embodiments, an adjustment member (for instance an adjustment screw 41) is provided for adjusting the tension force.

FIG. 2A shows a structure 60 that represents the engagement of force-transmission member 30 and resilient tension member 40 to the first reference spot 11, and should be considered in the context of the operation of forces and displacements parallel to the operative direction only. In this schematic drawing, the elements 30, 40 and 10 are not shown in line. The simple design of FIG. 2A is adequate if rotation of structure 60 and hence bending of the fiber 10 is acceptable, otherwise, the structure 60 should be provided with additional guiding means 56 to prevent rotation of structure 60 and hence bending of the fiber 10.

Thus, the acoustic pressure variations are sensed by the FBG 18. Further, static pressure variations are fully compensated and hence do not result in any shifting of the optical response range.

Figure 2D:
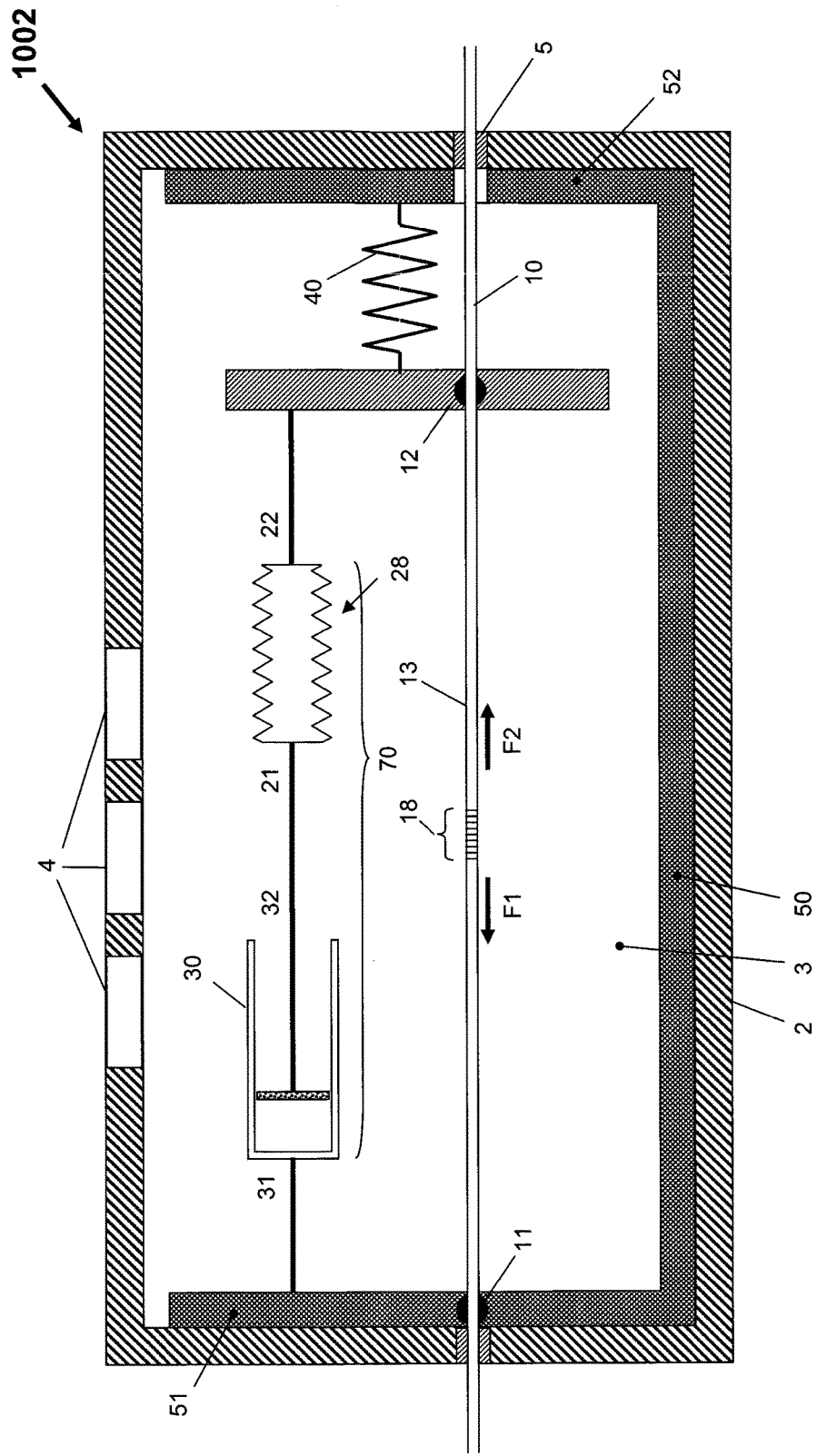
FIG. 2D is a diagram comparable to FIG. 2A, schematically showing a variation of the design shown in FIG. 2A.

FIG. 2D is a diagram schematically showing a variation 1002 of the design shown in FIG. 2A. In each of these figures, the force-transmission member 30 is attached to the first reference spot 11 while the pressure response means 28 is attached to the second reference spot 12. In FIG. 2A, the resilient tension member 40 is coupled between the first reference spot 11 and the reference frame 50 while the second reference spot 12 is fixed with respect to the reference frame 50, in contrast to FIG. 2D where the resilient tension member 40 is coupled between the second reference spot 12 and the reference frame 50 while the first reference spot 11 is fixed with respect to the reference frame 50.

Figure 3:
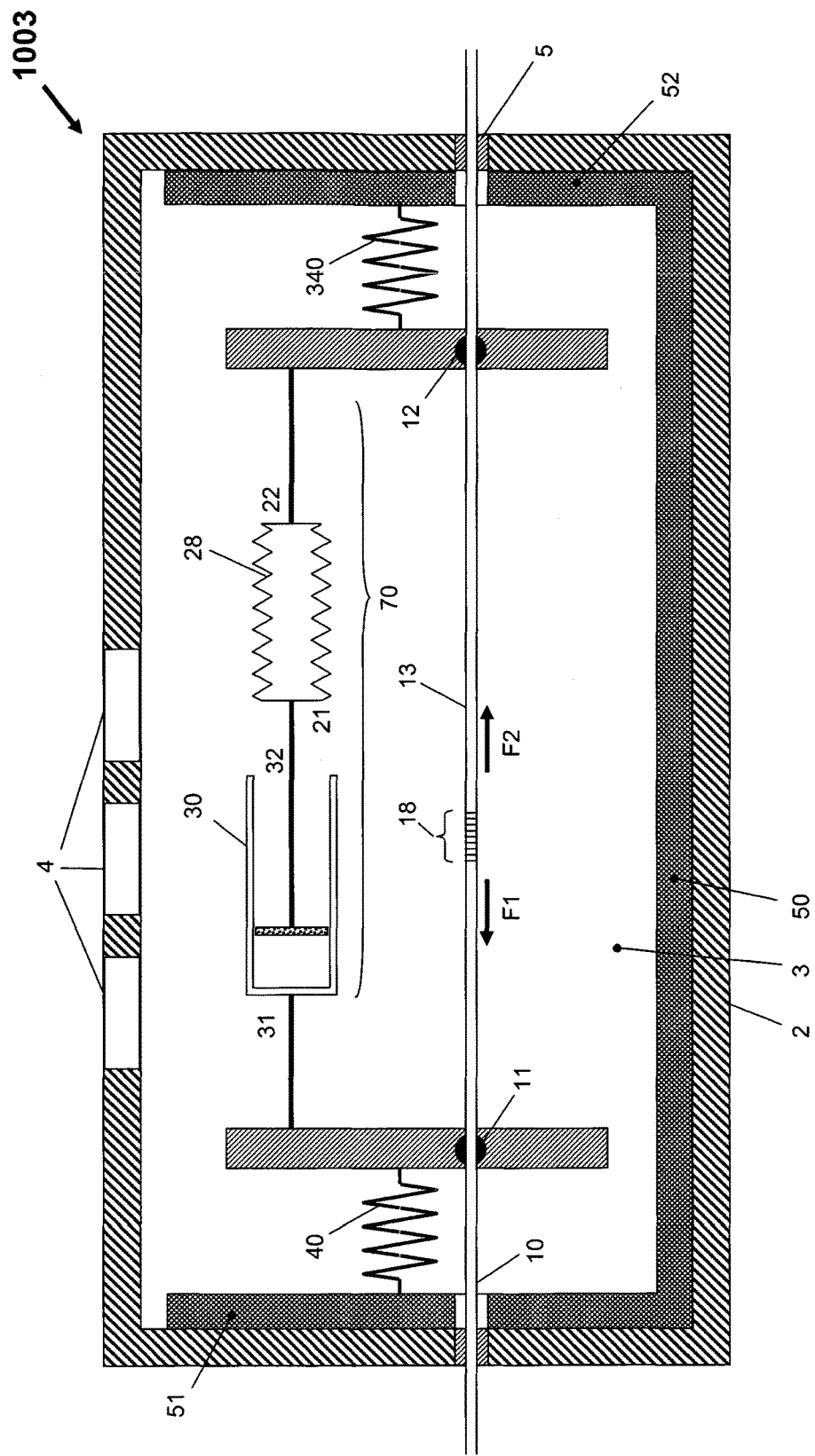
FIG. 3 is a diagram comparable to FIG. 2A, schematically illustrating the design of a second exemplary embodiment of an optical pressure sensor device according to the present invention.

FIG. 3 is a diagram illustrating the design of a further exemplary embodiment of an optical pressure sensor device 1003 according to the present invention, in which the optical pressure sensor device comprises two resilient tension members 40, 340 connected between the frame and the first and second reference spots 11, 12, respectively. Operation is the same as above, but this embodiment has an advantage that it is less sensitive to mechanical vibrations in the length direction of the fiber because the components mounted between the first and second reference spots 11, 12 are able to vibrate as a whole with respect to the frame 50 without stretching the fiber 13, and thus without interfering with a sensing signal derived form the FBG 18.

In the diagrams of FIGS. 2A, 2D and 3, only one pressure response assembly 70 is shown in parallel to the tensioned fiber portion 13. Although such embodiment will indeed be possible, a potential disadvantage of such an arrangement is that the fiber may bend. For improved stability, and also for improved sensitivity, it is preferred that the optical pressure sensor device has two or more pressure response assemblies arranged in parallel to the tensioned fiber portion 13, preferably arranged at equidistant angular intervals around the fiber 10.

Figure 4:
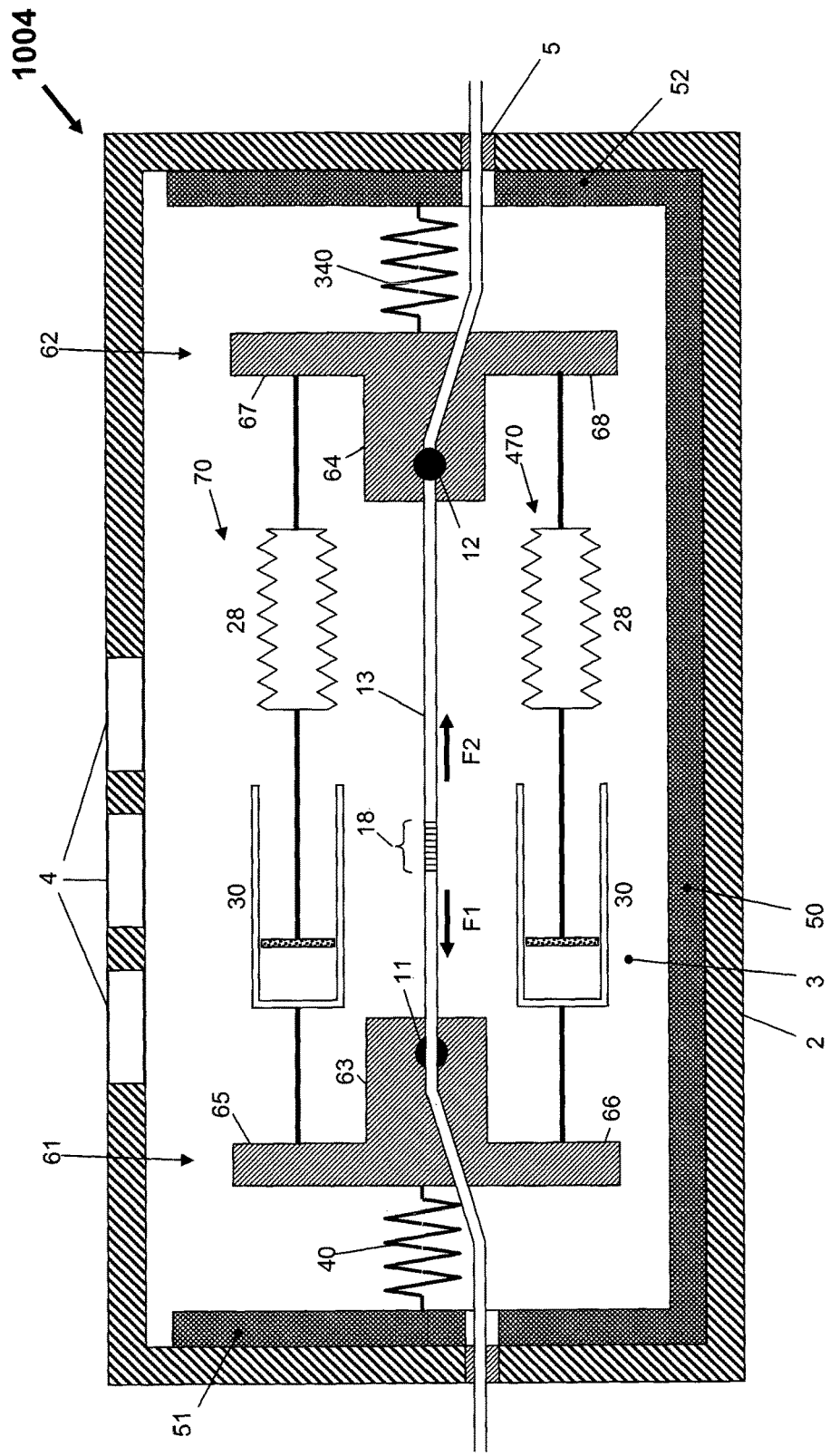
FIG. 4 is a diagram comparable to FIG. 2A, schematically illustrating the design of another exemplary embodiment of an optical pressure sensor device according to the present invention.

FIG. 4 is a diagram illustrating the design of a third exemplary embodiment of an optical pressure sensor device 1004 according to the present invention, in which there are two pressure response assemblies 70, 470 arranged at 180° with respect to the fiber 10, so that the longitudinal axes of the assemblies and the longitudinal axis of the fiber extend in one common virtual plane; such embodiment has the advantage that the transverse dimension of the sensor device as measured perpendicular to said virtual plane can be kept small. It is noted that the two (or more) pressure response assemblies preferably have mutually identical properties, and preferably have mutually identical design.

FIG. 4 further shows a preferred design feature of an optical pressure sensor device according to the present invention. For mounting the fiber 10, the optical pressure sensor device comprises first and second mounting brackets 61, 62. Each mounting bracket 61, 62 has a substantial T-shaped design, with a central body 63, 64 and two opposing arms 65, 66 and 67, 68, respectively. The central bodies 63, 64 are directed towards each other, and are attached to the first and second mounting spots 11, 12, respectively. The resilient members 40, 340 are attached to the opposite sides of the central bodies 63, 64, respectively, substantially in line with the fiber portion 13. The two pressure response assemblies are attached to the opposed arms of opposed central bodies 63, 64.

In an embodiment with three or more pressure response assemblies arranged parallel to the fiber, each mounting bracket may have three or more arms, or the individual arms may be replaced by a 360° disc perpendicular to the central body 63, 64.

In FIG. 4, the two pressure response assemblies are shown parallel to each other. Alternatively, the two pressure response assemblies may be arranged anti-parallel to each other.

It is noted that, in some embodiments where the optical pressure sensor device has two (or more) pressure response assemblies arranged parallel to each other, the corresponding components of these assemblies are mechanically connected to each other.

In the diagrams of FIGS. 2A, 2D, 3 and 4, each pressure response assembly 70 comprises only one pressure response means 28 and only one movement damper means 30. For improved pressure sensitivity, and also for reduced sensitivity to longitudinal structural vibrations, and with a view to reduction of component costs, it is preferred that each pressure response assembly 70 is symmetrical with respect to an imaginary transverse plane. FIGS. 5A-5F are diagrams illustrating design variations of a fourth exemplary embodiment of an optical pressure sensor device according to the present invention, where each pressure response assembly is always mirror-symmetric.

Figure 5A:
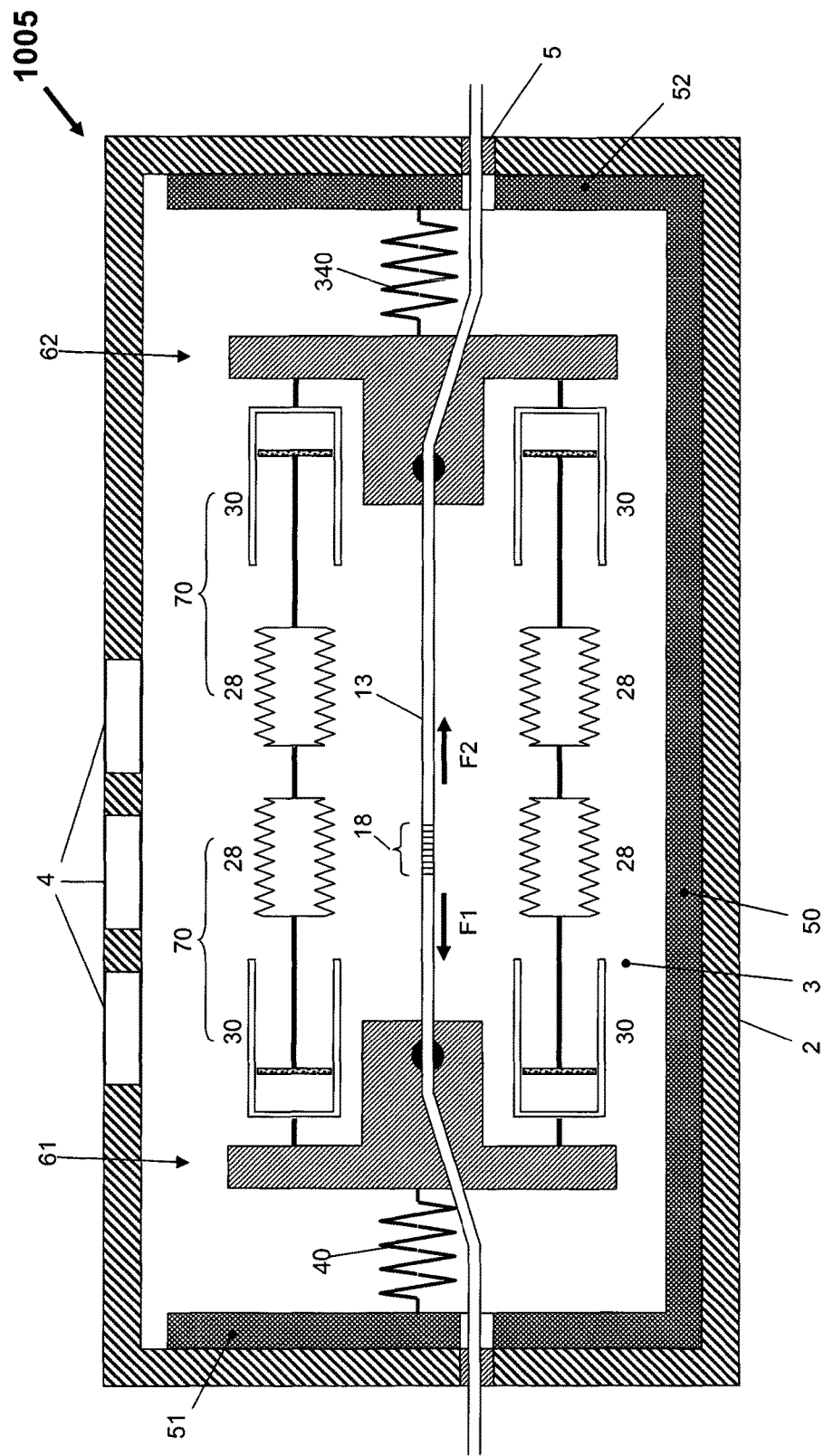
FIGS. 5A-5G are diagrams schematically illustrating design variations of a further exemplary embodiment of an optical pressure sensor device according to the present invention.
Figure 5B:
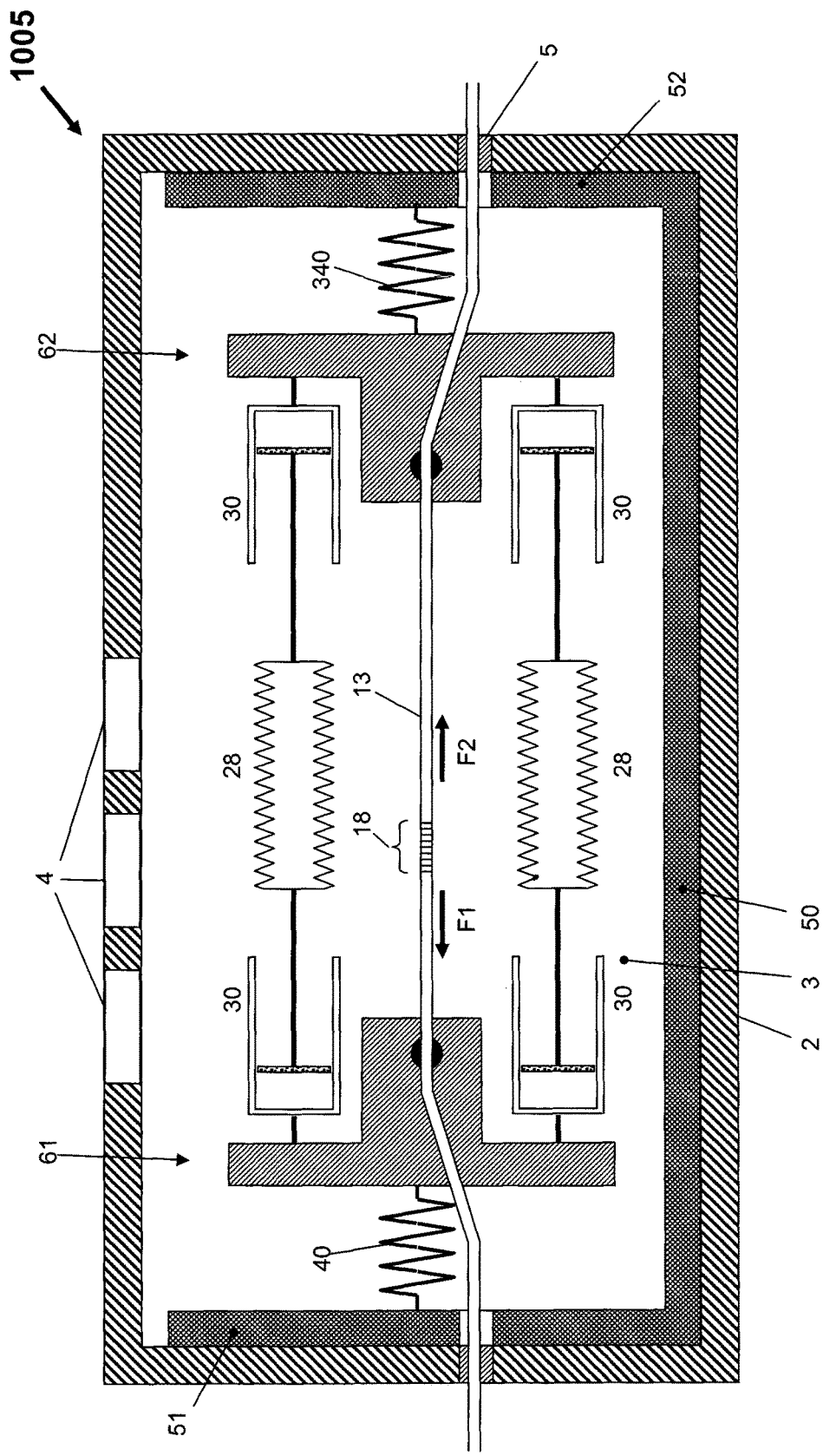

In FIG. 5A, each pressure response assembly comprises two pressure response means attached in series to each other, while two force-transmission members are arranged at opposite sides of these two pressure response means. The two pressure response means may be replaced by one pressure response means, as shown in FIG. 5B.

Figure 5C:
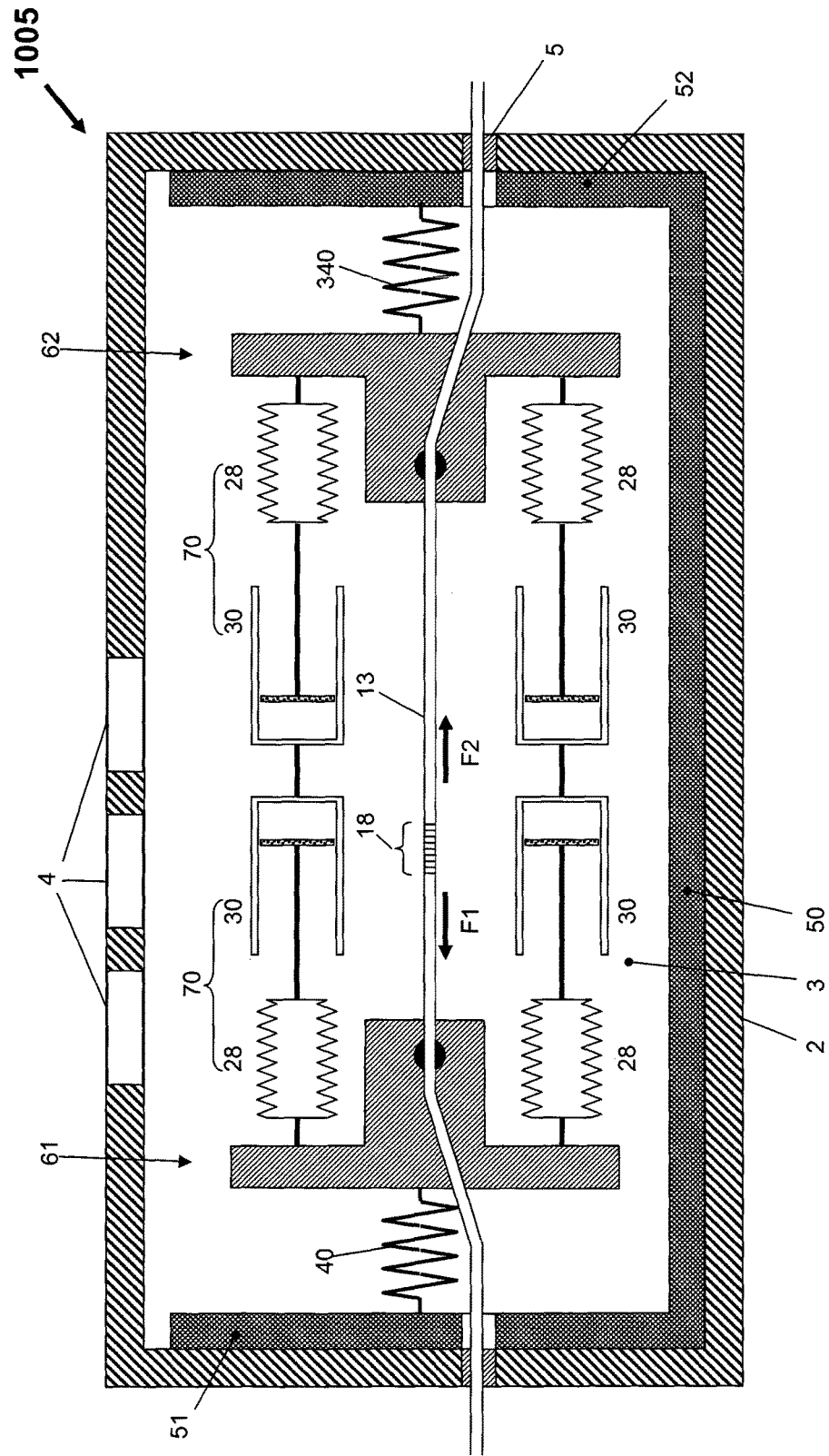

In FIG. 5C, each pressure response assembly comprises two force-transmission members attached in series to each other, while two pressure response means are arranged at opposite sides of these two movement dampers. The two force-transmission members may be replaced by one force-transmission member.

Figure 5D:
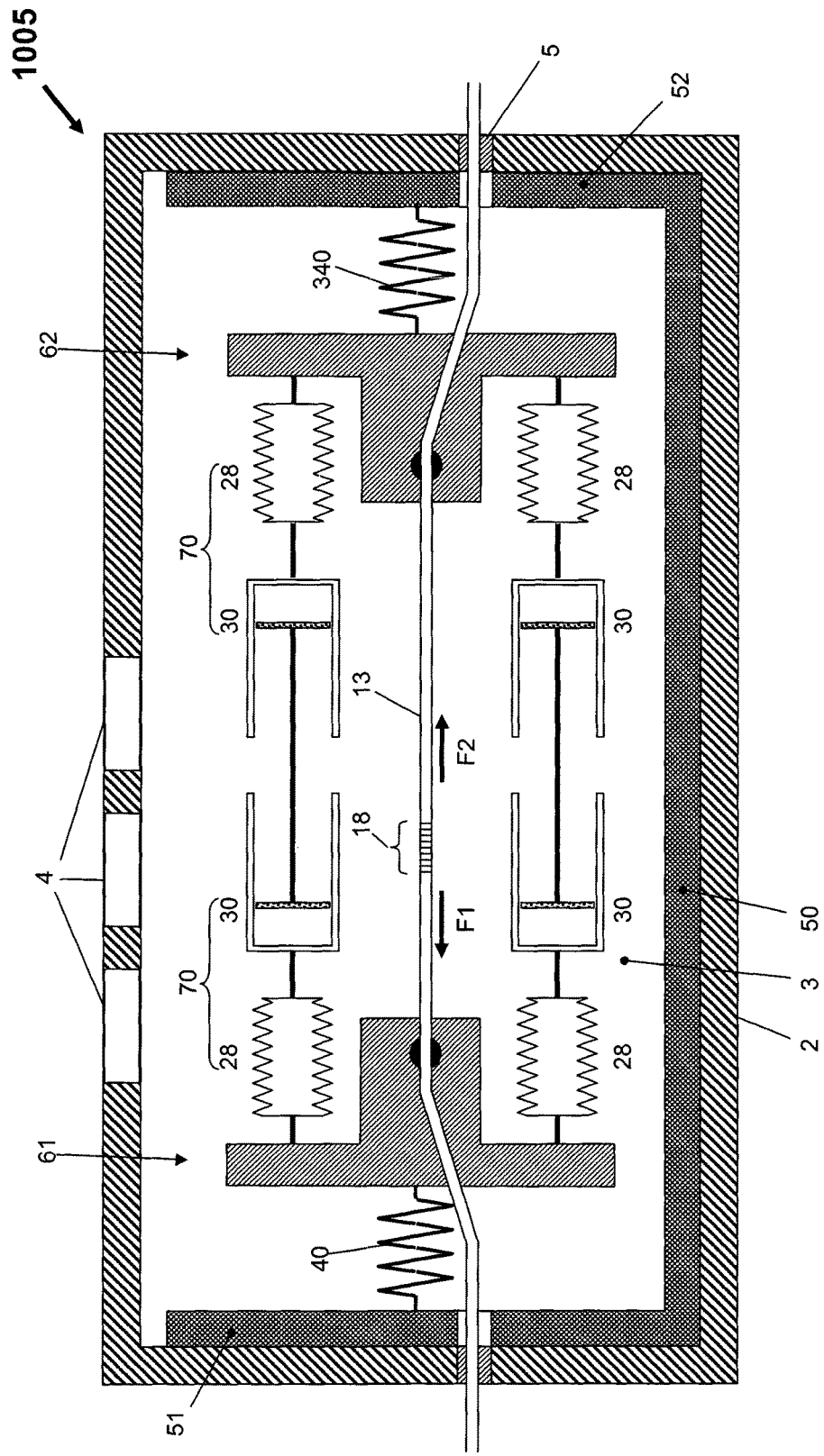
Figure 5E:
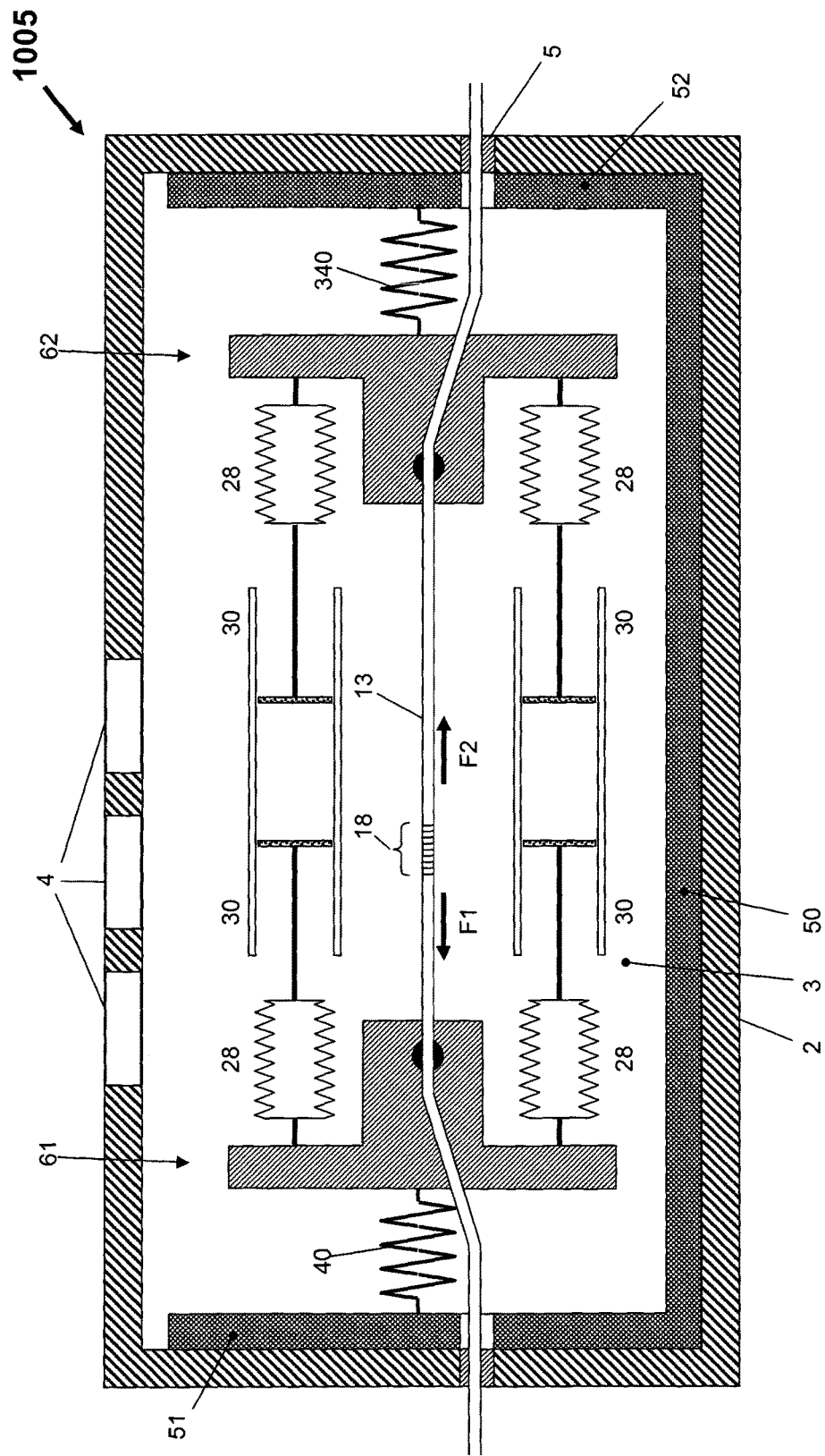

In FIG. 5C, the two force-transmission members are each implemented as a piston/cylinder combination, with the cylinders being attached to each other. FIG. 5D illustrates a similar embodiment, with the exception that the two pistons are attached to each other. FIG. 5E illustrates an embodiment comparable to FIG. 5C, in which the two cylinders are combined to form a single cylinder containing two opposite pistons.

Figure 5F:
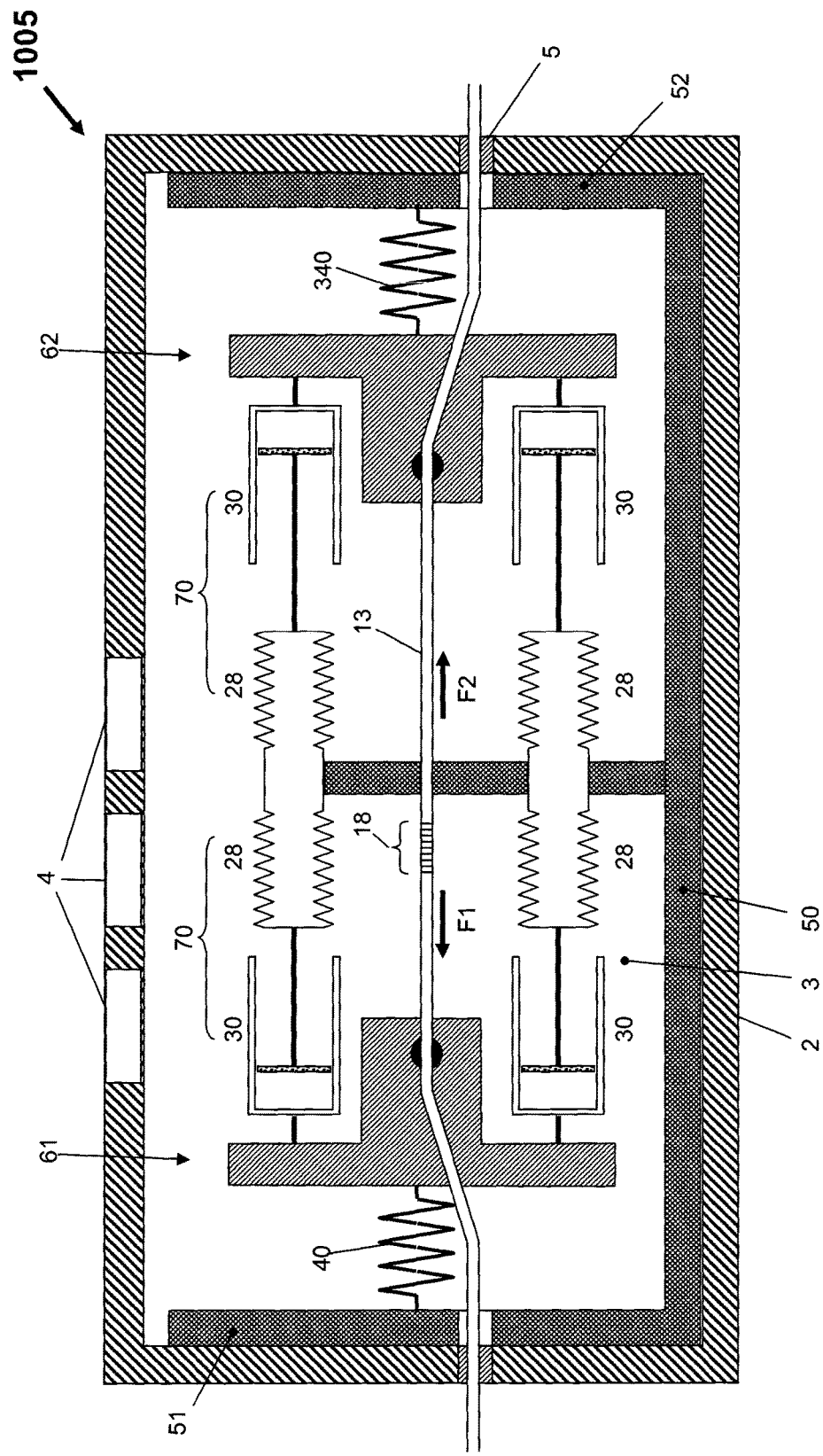

In such symmetrical design, the center of each branch should remain in place, which offers the possibility to fix this centre to the frame 50 for achieving increased stability. FIG. 5F illustrates an embodiment comparable to FIG. 5B, in which the centre of the central bellows is fixed to the frame. It is also possible to consider this as a series connection of two bellows, having a fluid connection connecting the interior of the one bellows to the interior of the other bellows.

Figure 5G:
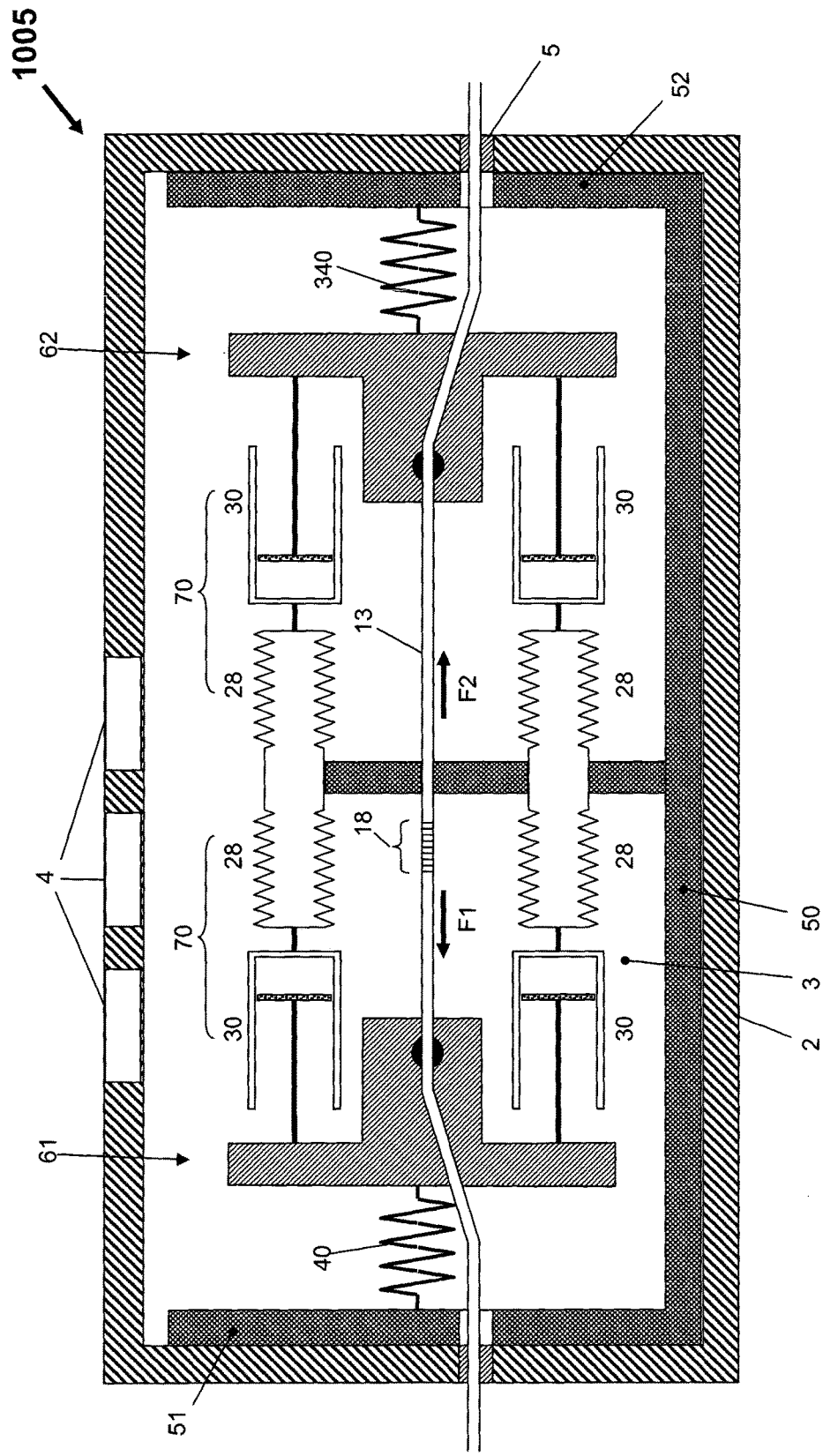
Figure 6:
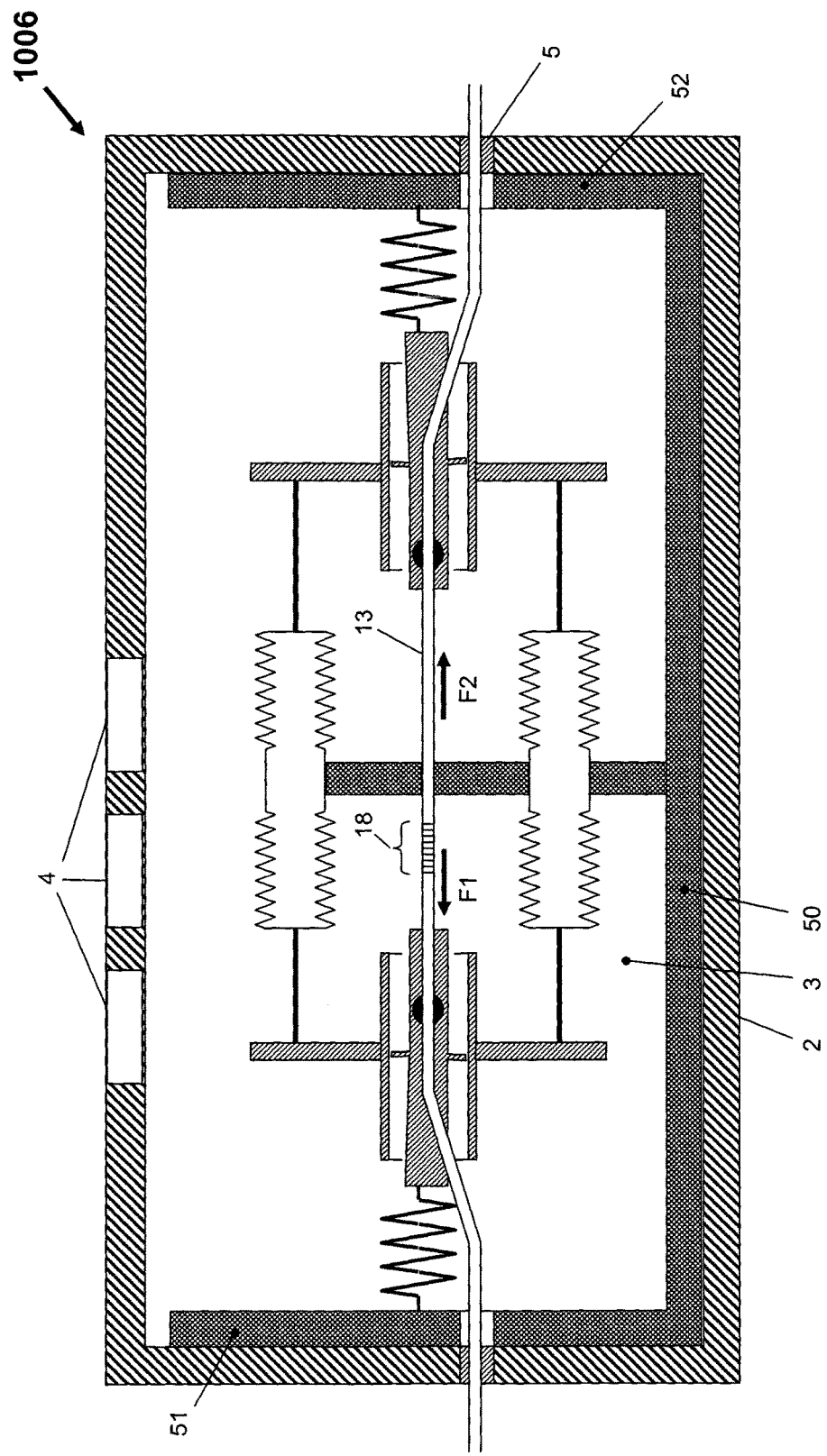
FIG. 6 is a diagram schematically illustrating an example of a further exemplary embodiment of an optical pressure sensor device according to the present invention.

In the embodiments of FIGS. 4, 5A, 5B, 5F, the two force-transmission members are each implemented as a piston/cylinder combination, with the cylinders being attached to the brackets 61, 62 to which the fiber 10 is mounted. In alternative embodiments, the orientation of the force-transmission members is inverted, so that the pistons are attached to the brackets 61, 62 to which the fiber 10 is mounted and the cylinders are attached to the respective pressure response means, as illustrated in FIG. 5G for an embodiment otherwise comparable to the embodiment of FIG. 5F. While maintaining transverse symmetry, in some embodiments the two (or more) force-transmission members are replaced by a single common force-transmission member having one common cylinder to which all pressure response means are attached, and having one common piston to which the fiber 10 is mounted and to which the tension member 40 is mounted, as illustrated in FIG. 6. If the diameter of this common cylinder is smaller than the radial distance between the two (or more) pressure response means, as is the case in FIG. 6, this common cylinder may be provided with a mounting flange for attaching the two (or more) pressure response means. It is noted that, as far as the coupling between fiber 10 and spring 40 is concerned, the function of the bracket 61 has been taken over by the common piston, and that, as far as the coupling between the pressure response means and the coupling point between fiber 10 and spring 40 is concerned, the function of the respective force-transmission members and the mounting arms 65, 66 has been taken over by the common cylinder and the mounting flange.

Figure 7:
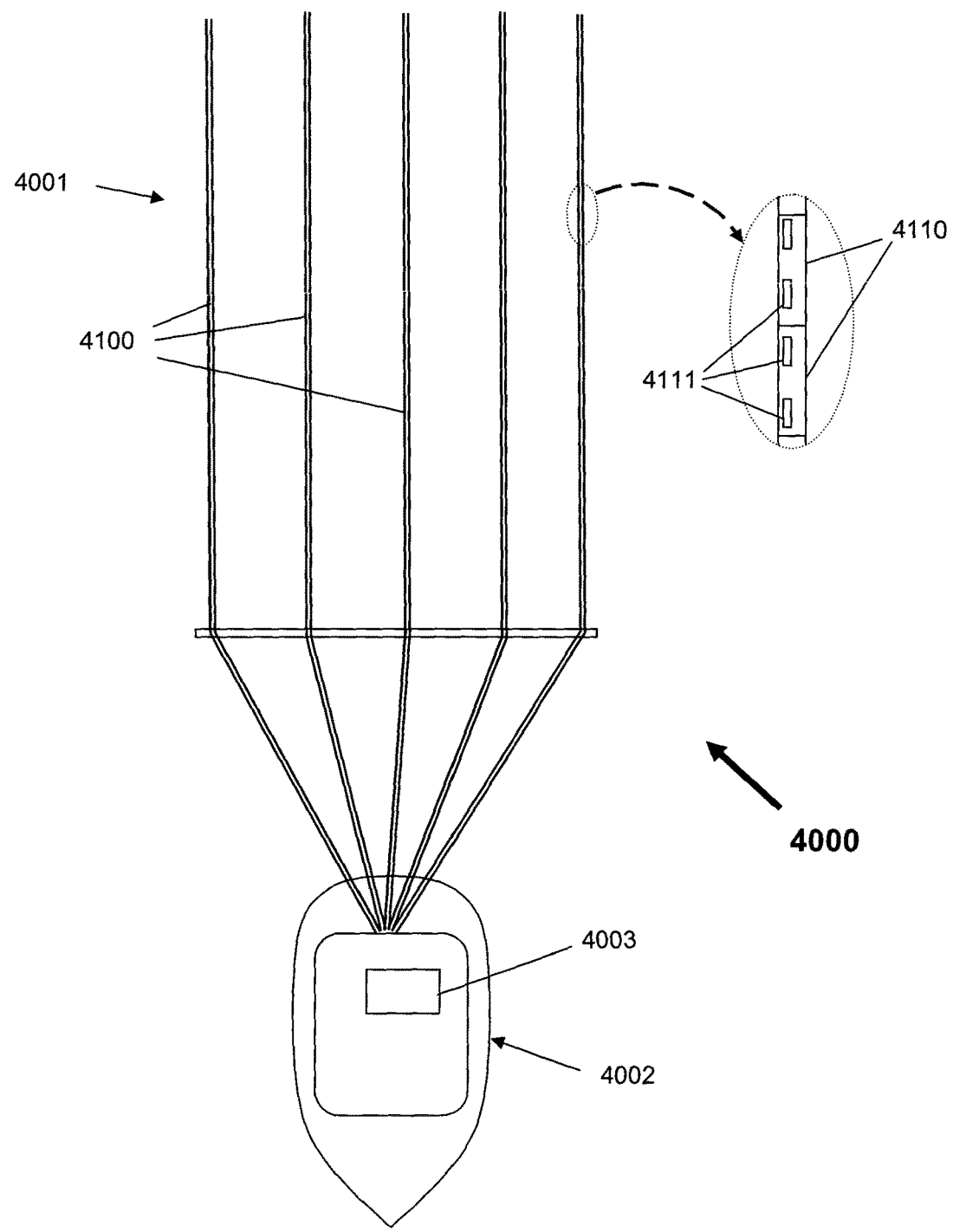
FIG. 7 is a diagram schematically illustrating a seismic exploration system.

FIG. 7 schematically illustrates a seismic exploration system 4000 implemented in accordance with the present invention. The seismic exploration system 4000 comprises an array 4001 of cables 4100, indicated as "streamers". The array 4001 is towed by a ship 4002. The individual cables have mutual distances in the order of about 50 meters. Each cable 4100, which may have a length of several kilometers, may be one integral length of cable, but typically a cable will comprise a plurality of cable sections 4110 attached to each other so that it is easily possible to adapt the cable length. Each cable 4100 includes a plurality of sensors 4111 arranged along its length, with a mutual distance in the order of a few meters. Each cable section 4110 may include just one sensor 4111, or may include two or more sensors, as shown. Each cable 4100 may be provided with functional units in between cable sections 4110, such as for instance so-called "birds" (known per se) for controlling the level of the streamer in the water.

The sensors may all have mutually identical design, but that is not essential. For performing reflection seismology in a sea or ocean, acoustic pulses are generated at or close to the water surface, by acoustic pulse generator means which may be conventional and which are not shown for sake of simplicity. Reflected acoustic waves, which travel in the water as pressure waves, are detected by the pressure sensors 4111. Measuring signals from the sensors 4111 travel along the streamers 4100 to a processing apparatus 4003 located, in the embodiment shown, aboard the ship 4002; alternatively, such processing apparatus 4003 may be located in a unit in between sections 4110.

Figure 8:
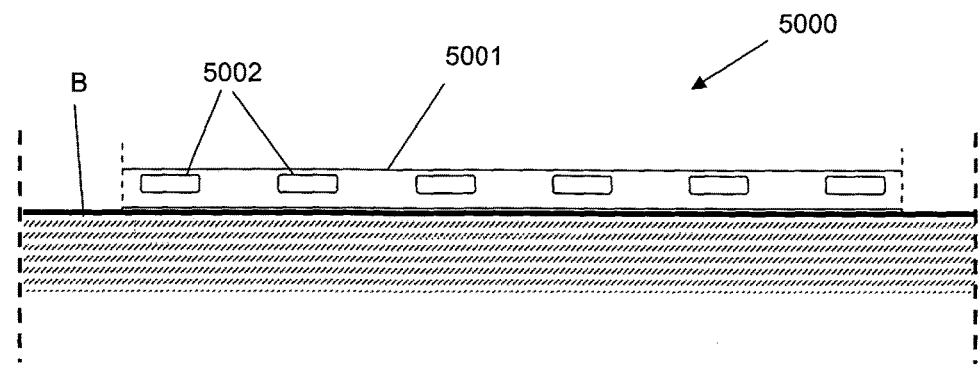
FIG. 8 is a diagram schematically illustrating a subsea pressure monitoring system.

In the context of water as wave-guiding medium, an advantageous exemplary application of the pressure-sensing device of the present invention is in subsea pressure monitoring. FIG. 8 schematically illustrates a subsea pressure monitoring system 5000, comprising a cable 5001 lying on the ocean floor B and comprising a plurality of sensors 5002. The system might alternatively comprise just one sensor, if the aim is spot monitoring.

Figures 9, 10:
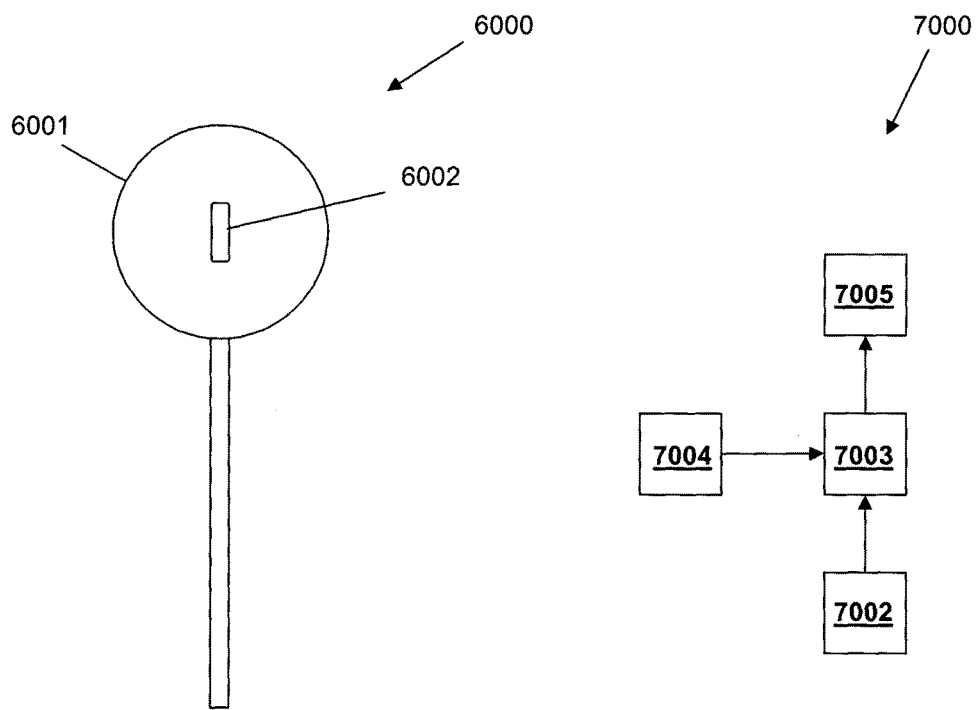
FIG. 9 schematically shows a microphone.
FIG. 10 schematically shows an ocean bottom node.

Another advantageous exemplary application of the pressure-sensing device of the present invention is in an ocean bottom node 7000, as schematically illustrated in FIG. 10. Such node comprises a battery 7004 powered device, comprising at least one sensor 7002, a processing apparatus 7003 receiving and processing the light output signal from the sensor 7002 (be it a reflected light beam or a laser light beam), and a transmitter 7005 for wirelessly transmitting the measurement results to some remote location.

The wave-guiding medium may also be air (or another gas). FIG. 9 schematically illustrates a sound detecting system 6000, comprising a microphone 6001 comprising at least one optical air pressure sensor device 6002 for detecting pressure waves in air.

In variations of embodiments, a separate frame may be omitted, or the frame 50 may be integral with the chamber 2, in which case the functional components of the sensor will be mounted and fixed with respect to the chamber 2. The presence of the separate frame 50 in any case facilitates the mounting of the components to the frame after which the assembled frame plus components will be mounted into the chamber. If, instead of a hard fixation, the frame 50 is weakly coupled to the chamber 2, vibration sensitivity can be further decreased.

Further, instead of the chamber 2 being filled with oil 3, another suitable liquid, gel, gas etc could be used.

Further still, in the above, the invention has been explained for the case of an FBG element. However, the invention can be implemented in conjunction with any type of fiber optics sensing element that produces an output signal depending on and representative for the strain and/or length variation in a sensing portion of the fiber.

Further, while the desirability of the present invention has been explained in the above for the field of reflection seismology, the applicability of a sensor according to the present invention is not limited to this field; such a sensor is useful wherever it is desirable to sense pressure waves, in any wave-guiding medium. The nature of the wave-guiding medium is not essential. The invention is further not limited to subsea applications but is applicable in various situations where AC pressures, notably sounds, are to be detected against a large DC background.

With respect to the tension member 40, it is noted that, depending on the nature of the measuring means, a nominal tension or bias tension exerted by this tension member may be equal to zero. In the embodiments with an optical fiber, this bias tension will usually be higher than zero.

With respect to the window of the pressure sensing device it is noted that this may be open or closed. In the case of a closed window, it would be advantageous if the window were closed by a flexible member, for instance a membrane, such as to allow for volume changes due to expanding or contracting pistons or bellows.

It should be clear to a person skilled in the art that the present invention is not limited to the exemplary embodiments discussed above, but that several variations and modifications are possible within the protective scope of the invention as defined in the appending claims. Even if certain features are recited in different dependent claims, the present invention also relates to an embodiment comprising these features in common. Any reference signs in a claim should not be construed as limiting the scope of that claim.

The invention claimed is:

1. A pressure sensor device comprising:
   two reference spots defining between them an operative direction along a virtual straight line connecting the reference spots;
   a resilient tension member for exerting a tension force on one of the reference spots in a direction parallel to the operative direction;
   a pressure response assembly connected in parallel to a resilient member and coupled to the reference spots, the pressure response assembly comprising a series arrangement of a pressure response element and a high-pass force-transmission member;
   wherein the pressure response element has an operative length parallel to the operative direction that is responsive to pressure, and is arranged for exerting operative forces pulling or pushing in a direction parallel to the operative direction; and
   wherein the high-pass force-transmission member is arranged for substantially passing the operative forces having a frequency above a threshold frequency and for substantially reducing or blocking the operative forces having a frequency below the threshold frequency; and
   optical measuring means for measuring the actual distance between the reference spots as being representative for the pressure to be sensed.

2. The pressure sensor device according to claim 1 further comprising:
   a chamber filled with a pressure transfer medium, the chamber being suitable for immersion in a fluid and having a window that at least partly transfers pressure waves in the fluid;
   wherein the pressure response element is arranged within the chamber and is responsive to the pressure of the pressure transfer medium.

3. The pressure sensor device according to claim 2, wherein the pressure transfer medium comprises a liquid.

4. The pressure sensor device according to claim 1, wherein the resilient member connects the reference spots; and
   wherein the resilient member comprises an optical fiber portion tensioned between the reference spots.

5. The pressure sensor device according to claim 4 further comprising:
   a frame having a first frame end and a longitudinally opposite second frame end;
   wherein the resilient tension member is connected in series to a parallel arrangement of the pressure response assembly and the optical fiber portion.

6. The pressure sensor device according to claim 4 comprising two pressure response assemblies connected in parallel;
   wherein the two pressure response assemblies and the resilient member are arranged in a common virtual plane.

7. The pressure sensor device according to claim 4 comprising three or more pressure response assemblies connected in parallel, wherein the pressure response assemblies are arranged around the resilient member.

8. The pressure sensor device according to claim 1, wherein the optical measuring means comprise an optical fiber portion tensioned between the reference spots.

9. The pressure sensor device according to claim 8, wherein the optical fiber portion comprises an optical sensing portion.

10. The pressure sensor device according to claim 9, wherein the optical sensing portion comprises a Fiber Bragg Grating.

11. The pressure sensor device according to claim 10, wherein the Fiber Bragg Grating comprises a reflector for reflecting a wavelength portion of an external interrogating light beam.

12. The pressure sensor device according to claim 9, wherein the optical sensing portion comprises part of a fiber laser.

13. The pressure sensor device according to claim 1 further comprising:
    a frame having a first frame end and a longitudinally opposite second frame end;
    wherein the resilient tension member is connected between one of the two reference spots and one of the two frame ends.

14. The pressure sensor device according to claim 1, wherein the pressure response element is provided with a progressive counterforce generator means.

15. The pressure sensor device according to claim 1, wherein the pressure response element comprises a piston in a cylinder.

16. The pressure sensor device according to claim 1, wherein the pressure response element comprises a bellows.

17. The pressure sensor device according to claim 1, wherein the pressure response element comprises a Bourdon tube.

18. The pressure sensor device according to claim 1, wherein the resilient tension member is connected between one of the two reference spots and a first frame end; and
    wherein the other of the two reference spots is fixed with respect to an opposite second frame end.

19. The pressure sensor device according to claim 1 further comprising a second resilient tension member for exerting a tension force on the other reference spot in a direction parallel to the operative direction;

wherein the resilient tension member is connected between one of the reference spots and a first frame end; and wherein the second resilient tension member is connected between the other of the reference spots and an opposite second frame end.

20. The pressure sensor device according to claim 1 comprising three or more pressure response assemblies, wherein the pressure response assemblies are arranged in a circular arrangement at mutually equal angular intervals.

21. The pressure sensor device according to claim 1 comprising two pressure response assemblies, wherein, in the longitudinal direction, each pressure response assembly is mirror-symmetric with respect to a virtual transverse mirror plane.

22. The pressure sensor device according to claim 21, wherein each pressure response assembly comprises one pressure response element arranged in series in between two high-pass force-transmission members.

23. The pressure sensor device according to claim 22 further comprising a frame;
wherein a central portion of the pressure response assembly is fixed with respect to the frame.

24. The pressure sensor device according to claim 21, wherein each pressure response assembly comprises a series arrangement of two pressure response elements arranged in series in between two high-pass force-transmission members.

25. The pressure sensor device according to claim 24 further comprising a frame;
wherein a point between the two pressure response elements is fixed with respect to the frame.

26. The pressure sensor device according to claim 21, wherein each pressure response assembly comprises a series arrangement of two high-pass force-transmission members arranged in series in between two pressure response elements.

27. The pressure sensor device according to claim 26, wherein each high-pass force-transmission member comprises a piston reciprocating in a cylinder filled with a fluid.

28. The pressure sensor device according to claim 27, wherein the two pistons of the two high-pass force-transmission members are connected together.

29. The pressure sensor device according to claim 27, wherein the two cylinders of the two high-pass force-transmission members are connected together.

30. The pressure sensor device according to claim 1 further comprising:
a second resilient tension member;
a second pressure response assembly; and
a frame;
wherein the high-pass force-transmission member of the pressure response assembly comprises a first piston reciprocating in a first cylinder, wherein a first end of the first piston connects to one of the two reference spots and wherein an opposite second end of the first piston connects to the frame via the resilient tension member;
wherein the high-pass force-transmission member of the second pressure response assembly comprises a second piston reciprocating in a second cylinder, wherein a first end of the second piston connects to the other of the two reference spots and wherein an opposite second end of the second piston connects to the frame via the second resilient tension member; and
wherein the pressure response elements of the pressure response assemblies each have a first end and a second end, wherein the first end of the pressure response element of the pressure response assembly is connected to the first cylinder and the second end of the pressure response element of the second pressure response assembly is connected to the second cylinder.

31. A streamer section for exploration comprising at least one pressure sensor device according to claim 1.

32. A streamer for exploration comprising:
a cable; and
and a plurality of pressure sensors arranged along a length of the cable;
wherein at least one of the pressure sensors comprises the pressure sensor device according to claim 1.

33. A streamer array comprising two or more streamers according to claim 32.

34. An exploration system comprising:
a streamer array according to claim 33;
a ship for towing the streamer array; and
a processing apparatus for receiving and processing measuring signals from each sensor device.

35. An exploration system comprising:
a streamer according to claim 32;
a ship for towing the streamer; and
a processing apparatus for receiving and processing measuring signals from each sensor device.

36. A cable for subsea pressure monitoring or submarine acoustic detection, the cable comprising at least one pressure sensor device according to claim 1.

37. A method of sensing a pressure in a medium comprising:
providing two reference spots;
connecting at least one resilient member between the two reference spots;
exerting a tension force on the resilient member;
receiving a pressure wave in the medium;
generating a pressure response force in response to a momentary pressure in the medium;
high-pass filtering the pressure response force to obtain a filtered response force;
subtracting the filtered response force from the tension force; and
optically measuring the actual distance between the reference spots as being representative for the pressure to be sensed.

38. The method according to claim 37, wherein the resilient member comprises an optical fiber comprising a Fiber Bragg Grating.

39. A method of sensing a pressure in a medium comprising:
providing two reference spots;
receiving a pressure wave in the medium;
generating a pressure response force in response to a momentary pressure in the medium;
high-pass filtering the pressure response force to obtain a filtered response force;
applying the filtered response force to at least one of the reference spots; and
optically measuring the actual distance between the reference spots as being representative for the pressure to be sensed.

40. A pressure sensor device comprising:
a pressure response element that has an operative length parallel to an operative direction that is responsive to pressure, and is arranged for exerting operative forces pulling or pushing in a direction parallel to the operative direction;

a high-pass force-transmission member arranged for substantially passing the operative forces having frequency above a threshold frequency and for substantially reducing or blocking the operative forces having a frequency below the threshold frequency; and optical measuring means for measuring the actual distance between two reference spots as being representative for the pressure to be sensed;

wherein the two reference spots define between them the operative direction.

41. The pressure sensor device according to claim 40 further comprising:

a chamber filled with a pressure transfer medium, the chamber adapted for immersion in a fluid and having a window that at least partly transfers pressure waves in the fluid;

wherein the pressure response element is arranged within the chamber and is responsive to the pressure of the pressure transfer medium.

42. The pressure sensor device according to claim 41, wherein the pressure transfer medium comprises a liquid.

43. The pressure sensor device according to claim 40 further comprising a resilient member connecting the reference spots;

wherein the resilient member comprises an optical fiber portion tensioned between the reference spots.

44. The pressure sensor device according to claim 40, wherein the optical measuring means comprise an optical fiber portion tensioned between the reference spots.

45. The pressure sensor device according to claim 44, wherein the optical fiber portion comprises an optical sensing portion.

46. The pressure sensor device according to claim 45, wherein the optical sensing portion comprises a Fiber Bragg Grating.

47. The pressure sensor device according to claim 46, wherein the Fiber Bragg Grating comprises a reflector for reflecting a wavelength portion of an external interrogating light beam.

* * * * *